(12) United States Patent
Feng et al.

(10) Patent No.: US 12,450,735 B2
(45) Date of Patent: Oct. 21, 2025

(54) LEARNING REPRESENTATIONS OF NUCLEI IN HISTOPATHOLOGY IMAGES WITH CONTRASTIVE LOSS

(71) Applicant: MEMORIAL SLOAN KETTERING CANCER CENTER, New York, NY (US)

(72) Inventors: Chao Feng, New York, NY (US); Chad Vanderbilt, New York, NY (US); Thomas Fuchs, New York, NY (US)

(73) Assignee: Memorial Sloan-Kettering Cancer Center, New York, NY (US)

( * ) Notice: Subject to any disclaimer, the term of this patent is extended or adjusted under 35 U.S.C. 154(b) by 447 days.

(21) Appl. No.: 17/901,397

(22) Filed: Sep. 1, 2022

(65) Prior Publication Data

US 2023/0070874 A1 Mar. 9, 2023

Related U.S. Application Data

(60) Provisional application No. 63/240,177, filed on Sep. 2, 2021.

(51) Int. Cl.
*G06T 7/00* (2017.01)
*G06T 3/60* (2024.01)
(Continued)

(52) U.S. Cl.
CPC .............. *G06T 7/0012* (2013.01); *G06T 3/60* (2013.01); *G06T 5/70* (2024.01); *G06V 10/25* (2022.01);
(Continued)

(58) Field of Classification Search
None
See application file for complete search history.

(56) References Cited

U.S. PATENT DOCUMENTS

| | | | |
|---|---|---|---|
| 2010/0329529 A1* | 12/2010 | Feldman | G06F 18/21375 |
| | | | 382/131 |
| 2022/0164946 A1* | 5/2022 | Pati | G16H 10/40 |
| | | (Continued) | |

OTHER PUBLICATIONS

Yang et al., "Applying Deep Neural Network Analysis to High-Content Image-Based Assays," SLAS Discovery 2019, vol. 24(8) 829-841 (Year: 2019).*

(Continued)

*Primary Examiner* — Soo Shin
(74) *Attorney, Agent, or Firm* — Bookoff McAndrews, PLLC

(57) ABSTRACT

Presented herein are systems and methods for classifying features from biomedical images. A computing system may identify a first portion corresponding to an ROI in a first biomedical image derived from a sample. The ROI of the first biomedical image may correspond to a feature of the sample. The computing system may generate a first embedding vector using the first portion of the first biomedical image. The computing system may apply the first embedding vector to a clustering model. The clustering model may have a feature space to define a plurality of conditions. The clustering model may be trained using a second embedding vectors generated from a corresponding second portions with at least one of a plurality of image transformation. The computing system may determine a condition for the feature based on applying the first embedding vector to the clustering model.

20 Claims, 15 Drawing Sheets

(51) Int. Cl.
*G06T 5/70* (2024.01)
*G06V 10/25* (2022.01)
*G06V 10/762* (2022.01)
*G06V 10/771* (2022.01)

(52) U.S. Cl.
CPC .......... *G06V 10/762* (2022.01); *G06V 10/771* (2022.01)

(56) References Cited

U.S. PATENT DOCUMENTS

| | | | | |
|---|---|---|---|---|
| 2023/0170050 A1* | 6/2023 | Cooper | ................... | G16B 40/20 706/21 |
| 2023/0419695 A1* | 12/2023 | Akers | ..................... | G06N 3/045 |
| 2024/0016901 A1* | 1/2024 | Sexton | ................. | A61K 31/675 |

OTHER PUBLICATIONS

Doyle et al., "Automated grading of breast cancer histopathology using spectral clustering with textural and architectural image features," 2008 5th IEEE International Symposium on Biomedical Imaging: From Nano to Macro, May 14-17, 2008 (Year: 2008).*

Basavanhally et al., "Computerized Image-Based Detection and Grading of Lymphocytic Infiltration in HER2+ Breast Cancer Histopathology," IEEE Transactions on Biomedical Engineering, vol. 57, No. 3, Mar. 2010 (Year: 2010).*

Abadi, Martín, et al., "TensorFlow: Large-Scale Machine Learning on Heterogeneous Distributed Systems", Preliminary White Paper, 2015, 19 pages.

Levy-Jurgenson, Alona, et al., "Spatial transcriptomics inferred from pathology whole-slide images links tumor heterogeneity to survival in breast and lung cancer," Scientific reports, 10(1), 2020, 11 pages.

Borros Arneth, "Tumor Microenvironment", Medicina, 56(1):15, 2020, 21 pages.

Xie, Chensu, et al., "VOCA: Cell Nuclei Detection in Histopathology Images by Vector Oriented Confidence Accumulation", Proceedings of Machine Learning Research, pp. 527-539, MIDL 2019, 13 pages.

Müllner, Daniel, "fastcluster: Fast Hierarchical, Agglomerative Clustering Routines for R and Python," Journal of Statistical Software, 53(9), 2013, 18 pages, URL http://www.jstatsoft. org/v53/i09/.

Diao, James A., et al., "Dense, high-resolution mapping of cells and tissues from pathology images for the interpretable prediction of molecular phenotypes in cancer," bioRxiv preprint, 2020, 14 pages.

Johnson, Jeff, et al., "Billion-scale similarity search with GPUs", arXiv preprint: arXiv:1702.08734v1, 2017, 12 pages.

Gamper, Jevgenij, et al., "PanNuke Dataset Extension, Insights and Baselines", arXiv:2003.10778v7, 2020, 12 pages.

Abduljabbar, Khalid, et al., "Geospatial immune variability illuminates differential evolution of lung adenocarcinoma", Nature Medicine, Author manuscript, available in PMC May 2, 2021, 45 pages.

Sirinukunwattana, Korsuk, et al., "Locality Sensitive Deep Learning for Detection and Classification of Nuclei in Routine Colon Cancer Histology Images", IEEE Transactions on Medical Imaging, 35(5):1196-1206, 2016.

McInnes, Leland, et al., "hdbscan: Hierarchical density based clustering", The Journal of Open Source Software, 2(11), 2017. doi: 10.21105/joss.00205.

Paszke, Adam, et al., "PyTorch: An Imperative Style, High-Performance Deep Learning Library", 33rd Conference on Neural Information Processing Systems (NeurIPS 2019), Vancouver, Canada, URL http://papers.neurips.cc/paper/ 9015-pytorch-an-imperative-style-high-performance-deep-learning-library. Pdf, 12 pages.

Campello, Ricardo, J.G.B., et al., "Density-Based Clustering Based on Hierarchical Density Estimates", In Pacific-Asia conference on knowledge discovery and data mining, PAKDD 2013. Lecture Notes in Computer Science, vol. 7819, Springer, Berlin, Heidelberg, 2013. https://doi.org/10.1007/978-3-642-37456-2_14.

Campello, Ricardo, J.G.B., et al., "A framework for semi-supervised and unsupervised optimal extraction of clusters from hierarchies", Data Mining and Knowledge Discovery, 27(3):344-371, 2013.

Graham, Simon, et al., "HoVer-Net: Simultaneous Segmentation and Classification of Nuclei in Multi-Tissue Histology Images", Medical Image Analysis, 58:101563, 2019, arXiv:1812.06499v5.

Paijens, Sterre T., et al., "Tumor-infiltrating lymphocytes in the immunotherapy era", Cellular & Molecular Immunology, 2020, 18 pages.

Chen, Ting, et al., "A Simple Framework for Contrastive Learning of Visual Representations", Proceedings of the 37th International Conference on Machine Learning, Vienna, Austria, PMLR 119, 2020, 11 pages.

Wang, Tongzhou, et al., "Understanding Contrastive Representation Learning Through Alignment and Uniformity on the Hypersphere," Proceedings of the 37th International Conference on Machine Learning, Online, PMLR 119, 2020, 11 pages.

Van Gansbeke, Wouter, et al., "SCAN: Learning to Classify Images without Labels", arXiv preprint arXiv:2005.12320v2, 2020.

Chen, Xinlei, et al., "Improved Baselines with Momentum Contrastive Learning", arXiv preprint arXiv:2003.04297v1, 2020.

Zhou, Yanning, et al., "CGC-Net: Cell Graph Convolutional Network for Grading of Colorectal Cancer Histology Images," In Proceedings of the IEEE/CVF International Conference on Computer Vision Workshops, arXiv:1909.01068v1, 2019.

* cited by examiner

LEARNING REPRESENTATIONS OF NUCLEI IN HISTOPATHOLOGY IMAGES WITH CONTRASTIVE LOSS

CROSS REFERENCES TO RELATED APPLICATIONS

The present application claims priority under 35 U.S.C. § 119(e) to U.S. Patent Provisional Application No. 63/240,177, titled "Learning Representations of Nuclei in Histopathology Images with Contrastive Loss," filed Sep. 2, 2021, which is incorporated herein by reference in its entirety.

BACKGROUND

A computing system may use various computer vision techniques to derive information from digital images.

SUMMARY

Aspects of the present disclosure are directed to systems, methods, and computer-readable media for classifying features from biomedical images. A computing system may identify a first portion corresponding to an ROI in a first biomedical image derived from a sample. The ROI of the first biomedical image may correspond to a feature of the sample. The computing system may generate a first embedding vector using the first portion of the first biomedical image. The computing system may apply the first embedding vector to a clustering model. The clustering model may have a feature space to define a plurality of conditions. The clustering model may be trained using a second plurality of embedding vectors generated from a corresponding second plurality of portions. Each portion of the second plurality of portions may correspond to a second ROI in a second biomedical image with at least one of a plurality of image transformation. The computing system may determine a condition for the feature from the plurality of conditions based on applying the first embedding vector to the clustering model. The computing system may store, in one or more data structures, an association between the condition for the feature and the first biomedical image.

In some embodiments, the computing system may provide information based on the association between the condition for the first feature and the first biomedical image. In some embodiments, the computing system may determine the condition by identifying, from a plurality of regions defined in the feature space for the plurality of conditions, a region in which the embedding vector is situated.

In some embodiments, the plurality of conditions defined by the feature space may include: (i) a first subset of conditions identified during training and (ii) a second subset of conditions identified subsequent to the training. In some embodiments, the plurality of image transformations may include at least one of color jittering, blurring, rotation, flipping, or background replacement.

In some embodiments, the computing system may identify the first portion to generate a bounding box to define the ROI within the biomedical image. In some embodiments, the feature may include at least one nucleus in the sample and the plurality of conditions may include a plurality of cancer subtypes.

Aspects of the present disclosure are directed to systems, methods, and computer-readable media for training models to classify features corresponding to regions of interest (ROIs) in biomedical images. A computing system may identify a training dataset identifying a plurality of instances. Each of the plurality of instances may include a first portion corresponding to a respective ROI in a biomedical image derived from a sample, with the respective ROI corresponding to a feature in the sample. The computing system may add at least one of a plurality of image transformations to the first portion to generate a second portion for each instance of the plurality of instances. The computing system may generate a plurality of embedding vectors from the second portion for each of the plurality of instances. The computing system may apply the plurality of embedding vectors to a clustering model to determine a plurality of positions within a feature space defined by the clustering model for the plurality of conditions. The computing system may update the feature space of the clustering model based on the plurality of positions corresponding to the plurality of instances. The computing system may store the feature space of the clustering model to define the plurality of conditions.

In some embodiments, the computing system may determine (i) a first loss metric to align a first subset of embedding vectors generated from a corresponding first subset of a plurality of second portions and (ii) a second loss metric to disperse the first subset of embedding vectors from at least one second subset of embedding vectors generated from a corresponding second subset of second portions. In some embodiments, the computing system may update the feature space in accordance with at least one of the first loss metric or the second loss metric.

In some embodiments, the computing system may identify, for an embedding vector, a subset of the plurality of embedding vectors based on a respective distance between the embedding vector and each of the subset of the plurality of embedding vectors. In some embodiments, the computing system may define, within the feature space, a region including the subset as for the first condition based on an identification of the first condition in each instance of a subset of the plurality of instances corresponding to the subset, to update the feature space.

In some embodiments, the computing system may determine a distance between an embedding vector of the plurality of embedding vectors and a first region of a plurality of regions within the feature space corresponding to the plurality of conditions defined by the training dataset. In some embodiments, the computing system may define, responsive to the distance being greater than a threshold, a second region to include to the plurality of regions corresponding to a condition different from any of the plurality of conditions, to update the feature space.

In some embodiments, the computing system may identify the respective portion in each instance of the plurality of instances to generate a bounding box to define the ROI within the biomedical image. In some embodiments, the computing system may add at least one of the plurality of image transformations by selecting, for the first portion, an image transformation from the plurality of image transformations in accordance with a function.

In some embodiments, the plurality of image may include at least one of color jittering, blurring, rotation, flipping, or background replacement. In some embodiments, the feature may include at least one nucleus in the sample and the plurality of conditions may include a plurality of cancer subtypes.

DETAILED DESCRIPTION

Figure 1:
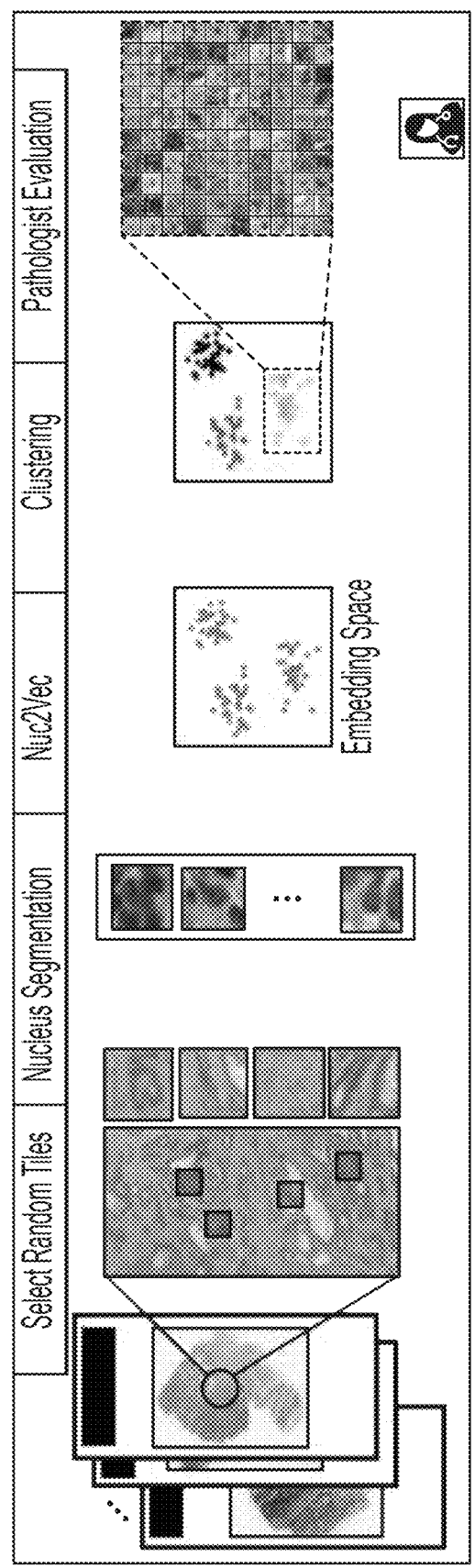
FIG. 1: Overview of Methods: A dataset was collected of nuclei through nucleus segmentation on randomly selected tiles from WSIs. Nuc2Vec was developed to compute vector embeddings for these nuclei. Hierarchical clustering of the embeddings reveals subtypes in the nuclei population which are verified by a board-certified pathologist.

Following below are more detailed descriptions of various concepts related to, and embodiments of, systems and methods for classifying features corresponding to regions of interest (ROIs) in biomedical images. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes learning representations of nuclei in histopathology images with contrastive loss.

Section B describes systems and methods for classifying features corresponding to regions of interest (ROIs) in biomedical images.

Section C describes a network environment and computing environment which may be useful for practicing various computing related embodiments described herein.

A. Learning Representations of Nuclei in Histopathology Images with Contrastive Loss The tumor microenvironment is an area of intense interest in cancer research and may be a clinically actionable aspect of cancer care. One way to study the tumor microenvironment is to characterize the spatial interactions between various types of nuclei in cancer tissue from H&E whole slide images, which requires nucleus segmentation and classification. Methods of nucleus classification rely on extensive labeling from pathologists and are limited by the number of categories into which a nucleus can be classified. In this disclosure, leveraging existing nucleus segmentation and contrastive representation learning methods, a model was developed that learns vector embeddings of nuclei based on their morphology in histopathology images. The embeddings learned by this model capture distinctive morphological features of nuclei and can be used to group them into meaningful subtypes. These embeddings can provide a much richer characterization of the statistics of the spatial distribution of nuclei in cancer tissue and open new possibilities in the quantitative study of the tumor microenvironment.

Presented herein, leveraging existing nucleus segmentation and contrastive representation learning methods, a model was created that learns vector embeddings of nuclei based on their morphology in histopathology images. It is shown that the embeddings learned by this model capture distinctive morphological features of nuclei and can be used to group them into meaningful subtypes. These embeddings can provide a much richer characterization of the statistics of the spatial distribution of nuclei in cancer tissue and open new possibilities in the quantitative study of the tumor microenvironment.

1. INTRODUCTION

The tumor microenvironment (TME) plays a vital role in the growth and metastasis of cancer. One important characteristic of TME is the spatial interactions between various types of nuclei in cancer tissue, e.g., the infiltration of tumor cells by lymphocytes. Hematoxylin and eosin (H&E) stained histopathology slides provide a holistic morphological picture of TME and serve as a critical tool for the clinical assessment of cancer. Recent advances in digital and computational pathology, in particular, nuclear detection or segmentation, and nuclear classification, have enabled large scale delineation of nuclear maps in whole-slide images (WSI). These developments not only promise more efficient and reproducible clinical evaluation of TME but also opened the possibility of discovering new statistics to quantitatively characterize TME for a deeper understanding of the diseases and their prognosis.

Existing nucleus classification methods only classify nuclei into one of several categories, such as lymphocytes, tumor cells, and healthy epithelial cells, among others. Such a paradigm may ignore subtle morphological differences such as those distinguishing tumors from different cancer types. A finer-grained classification could help understand the diversity of disease processes and identify clinically meaningful subgroups of patients. However, such endeavors based on current supervised nucleus classification methods would require tedious efforts of pathologists to label each nucleus as one of many categories, which may also be prone to inter-observer variations. In the present disclosure, Nuc2Vec, an unsupervised method that learns vector embeddings of nuclei based on their morphological features presented in H&E images. Such embeddings can be used for fine-grained clustering of nuclei population and provide a more comprehensive description of the nuclei landscape in WSIs of cancer tissue.

The approach is based on the contrastive learning methods that have achieved reasonable success in unsupervised classification of natural images. The hypothesis is that certain transformations of the image patch centered around a nucleus, such as color jitter and rotation, should not change its identity. A specific version of contrastive learning loss was chosen: the Euclidean distance between embedding vectors from image augmentations of the same nuclear instance is minimized; otherwise, the embedding vectors are distributed uniformly on a unit high-dimensional sphere. These method learned embeddings show such that similar nuclei are close to each other in the embedding space (section 3.1) and these embeddings can be used to group nuclei into visually meaningful subtypes (section 3.2).

The main contributions of this work are as follows: (i) Nuc2Vec was designed based on contrastive learning and introduced 'background replacement' image transformation to enable efficient representation learning for nuclear morphology; (ii) nucleus classification was expanded by increasing the number of categories from a few to over a hundred, and conducted in-depth review of these find-grained nuclear subtypes; (iii) training and evaluation at scale was conducted by investigating one million nuclei from ten different cancer types.

2. METHODS

2.1 Overview

In FIG. 1, an overview of these methods was provided. A dataset of nuclear instances was first collected by selecting random tiles from WSIs and perform nucleus segmentation using Hovernet (section 2.2). Nuc2Vec was used to compute embeddings of nucleus images (section 2.3). Hierarchical clustering was performed on the nuclear embeddings and extract stable flat clusters of nuclei (section 2.4). Finally, for each cluster 100 nuclear instances were randomly selected for expert review by a board-certified pathologist to determine whether the clustering captures known or novel nuclear subtypes with distinctive morphological features.

2.2 Datasets of Nuclear Instances

A dataset of nuclear instances was created from WSIs of the patients who have undergone broad genomic sequencing analysis by MSK-IMPACT at Memorial Sloan-Kettering Cancer Center (MSKcc). The slides were chosen from the sequencing cohort as they are pre-selected to contain predominantly tumor tissue. Ten of the most prevalent type of cancers were selected, including Bladder, Breast, Colorectal, Endometrial, Ovarian, Pancreatic, Prostate Cancers as well as Non-small Cell Lung Cancer, Glioma and Melanoma. For each type of cancer, 50 slides (one slide per case) were randomly selected among 100 slides with the largest tissue areas. All slides were scanned at 20×. For each slide, 400 512×512 image tiles are randomly selected. The Hovernet inference is then run using weights provided by the author (pre-trained on the dataset with Tensorflow). Since the weights were trained on 40× images, the selected image's tiles are resized to 1024×1024. Finally, for each type of cancer, 100k nuclear instances are randomly selected from all the segmented nuclei. As such a dataset of 1 million nuclear instances of ten different cancer types is obtained. For each nucleus, the 128×128 image patch centered around it is defined as a nucleus image.

2.3 Nuc2Vec

To learn embeddings that represent the morphological essence of nucleus through contrastive learning, image transformations were designed to perturb the nucleus image as much as possible while preserving its semantics. Several standard image transformations are used including resizing with a random scale between 0.5 and 1, randomly applied color jittering, Gaussian blurring, rotation, vertical and horizontal flipping, each with 50% probability. In addition to these, to emphasize the morphological features of the nucleus itself rather than the texture of its background. A new image transformation called 'background replacement' is also used. A bounding box was generated for each nucleus from the segmentation masks predicted by Hovernet. In 'background replacement', the region of nucleus image within the bounding box is maintained while the background region is replaced by a randomly sampled 128×128 region in the same 1024×1024 image tile. As such the same nucleus is placed in a different but similar context. In section 3.1 it is shown that without this transformation, the background of the nucleus is overemphasized, and the features of nucleus itself are not adequately accounted for by the model. This method of contrastive learning with 'background replacement' transformation is called Nuc2Vec.

A specific variant of MOCOv2 and code is used which is implemented in Pytorch. Specifically, A ResNet34 is used as the encoder to compute a 128-dimensional embedding vector, and added another linear layer of size 512 with ReLU activation before the final embedding. The combined alignment and uniformity loss is used, which is briefly explained in the third paragraph of section 1. All models used in the result sections are trained on the dataset described in 2.2 for 30 epochs with 4 Tesla V100 GPUs.

2.4 Hierarchical Clustering of Nucleus Embeddings

To discover subtypes in the nuclei population, hierarchical clustering of the nuclear embeddings is performed with ward linkage using fastcluster package. The 'excess of mass (EOM)' algorithm as implemented in HDBSCAN package is used to extract flat clusters with different levels of granularity. To evaluate the stability of clustering with respect to the 'minimum cluster size (MCS)' parameter used in EOM, 10 subsamples of 100k nuclei is randomly selected from the training dataset. For each subsample, hierarchical clustering is performed, flat clusters are extracted using different values of MCS, and each instance in the training dataset is assigned by a majority vote of the cluster labels of its 1,023 nearest neighbors in the subsample. For each MCS, the average pairwise adjusted mutual information score is calculated (AMS) between clustering results based on different subsamples. The AMS is found to be approximately 0.6 within a range of MCS values (300~700).

2.5 Assigning Clusters to New Nuclear Instances

Given a nucleus image unseen during the training of Nuc2Vec, its vector embedding can be computed using the trained ResNet34 model. Its 1,023 nearest neighbors were then found in the embedding space among the training data using faiss. Finally, the majority vote is taken of the cluster labels of these 1,023 nearest neighbors as the assigned cluster label for the given nucleus image.

3. EXPERIMENTAL RESULTS 3.1 Nuc2Vec for Learning Useful Embeddings of Nuclei

A useful embedding should place nuclei with similar features close to each other. Thus, nuclear instances are randomly selected from the training dataset and visualize their nearest neighbors in the embedding space. To demonstrate the effect of this method, two other embeddings are also constructed for each nucleus: a 27-dimensional hand-engineered features and features learned using contrastive loss without 'background replacement'. Specifically, the hand-engineered features are constructed based on the segmentation masks predicted by HoverNet, including area, eccentricity, solidity, extent, major/minor axis length, perimeter, orientation and 9-dimensional central moments, as well as texture features such as the statistics of gray level co-occurrence matrices. Each dimension of the feature is converted to standard score. Based on expert review, it is found that Nuc2Vec is best at capturing the essence of nucleus morphology.

Figure 2:
FIG. 2: Comparison of embeddings based on the 15 Nearest Neighbors of four randomly selected nuclei instances: hand-engineered features (A), contrastive learning without 'background replacement' (B) and Nuc2Vec (C). Letters in the bottom right box of each nucleus image refer to the tissue type as follows, BL: Bladder; BR: Breast; C: Colorectal; E: Endometrial; G: Glioma; L: Lung; M: Melanoma; O: Ovarian; PA: Pancreas; PR: Prostate.

In FIG. 2, the quality of the embeddings is illustrated with four examples chosen from 42 randomly selected samples. The four instances are marked by green boxes. For each example, its 15 nearest neighbors are shown according to three different embeddings: hand-engineered features (A), embeddings learned using contrastive loss without 'background replacement' (B) and Nuc2Vec (C). From left to right, the first instance is a spindle-shaped stromal nucleus; the next two instances are tumor nuclei with visible nucleolus, with the second one slightly bigger; finally there is a tumor nucleus with white content in the center, which suggests the complexity of nucleus as indicated by a lack of Hematoxylin uptake. In all four instances, the nearest neighbors according to embeddings learned by Nuc2Vec most clearly captures said nucleus morphology.

3.2 Hierarchical Clustering Uncovers Subtypes in Nuclei Population

Figure 3:
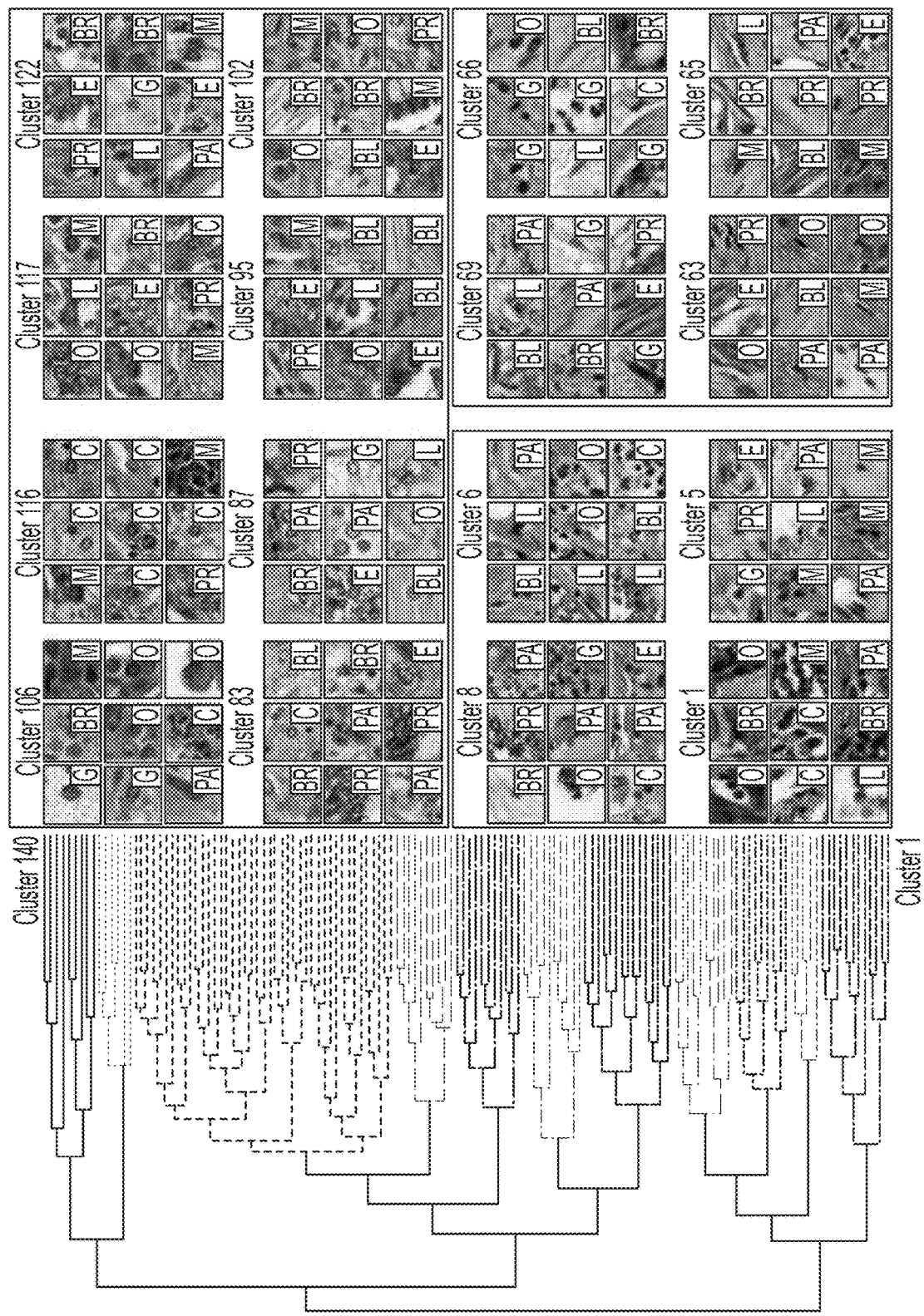
FIG. 3: Dendrogram of the hierarchical clustering result using a randomly selected subsample of 100k nuclear instances. Each leaf corresponds to one of the 140 clusters extracted with the EOM algorithm. The clusters are ordered from 1 to 140 from bottom to top. These clusters were organized into 11 branches. Nuclei samples from selected clusters are depicted for the blue, pink and olive branch in the boxes with the corresponding color. See text for a detailed description of the morphology features of these branches. Tissue types are coded as in the previous figures.

Hierarchical clustering of the learned embeddings is used to identify subtypes in the nuclei population. For each subtype, 100 nucleus images are randomly sampled for a board-certified pathologist to review their morphological features and determine if a majority of them belong to a known nucleus type. In FIG. 3, a Dendrogram of clustering result is shown based on a randomly selected subsample of dataset as described in section 2.4. EOM with MCS equals 400 (for a dataset of size 100k) is used, which extracted 140 clusters. Note that different MCS does not affect the stability of clustering results significantly. On the other hand, a larger value of MCS will lead to a smaller number of clusters and vice versa. This specific value is chosen for qualitatively optimal clustering.

140 clusters can be organized into 11 branches by cutting the hierarchical clustering tree at a fixed threshold. Through expert review, it is found that most of these branches have well defined features while nuclei are further grouped into clusters within each branch with more subtle morphological differences. For example, as shown in FIG. 3, the blue branch (clusters 1-12) are predominately lymphocytes; the pink branch (clusters 62-72) are mostly stromal or elongated tumor nuclei. Most interestingly, the largest, olive branch (clusters 83-125) are mostly composed of diverse clusters of tumor nuclei with distinctive features. To partially verify the morphological features of each cluster, a board-certified pathologist provided scores in terms of size, darkness, color consistency, border irregularity, cytoplasm visibility as well as degree of elongation of the nuclei, based on visual inspections of 100 randomly selected samples for each cluster. A more detailed discussion of the morphological scores is provided in the appendix and includes the score table as supplemental materials.

Figure 4:
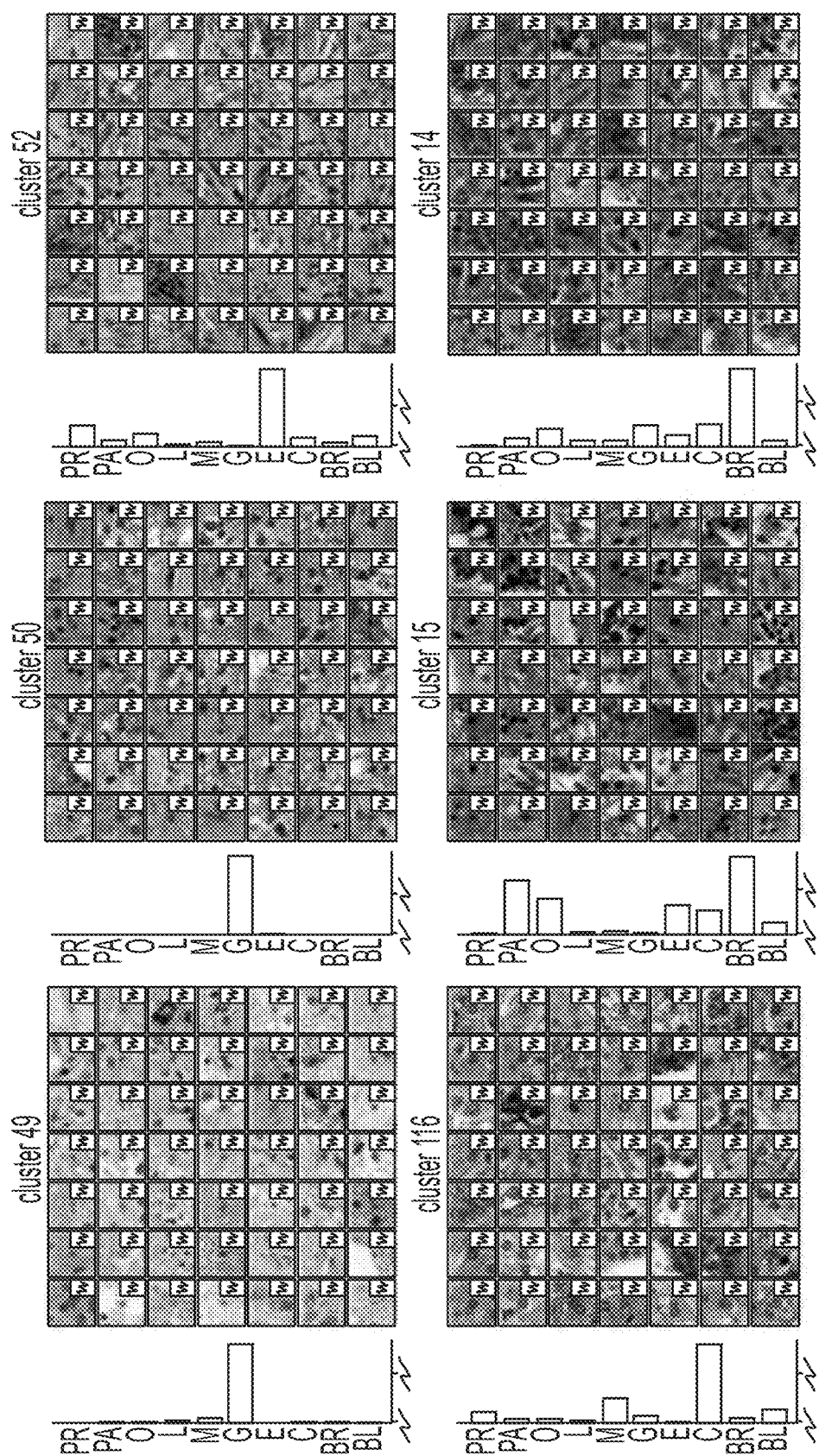
FIG. 4: Example nuclei from the six clusters with the most imbalanced distribution of the ten cancer types. The distribution is shown as bar plot on the left of each image. BL: Bladder; BR: Breast; C: Colorectal; E: Endometrial; G: Glioma; L: Lung; M: Melanoma; O: Ovarian; PA: Pancreas; PR: Prostate. See text for detailed description for each cluster.

For each cluster, the entropy of the distribution of their occurrence was calculated in the ten different cancers. In FIG. 4, randomly selected nucleus images are shown from each of the 6 clusters with the lowest entropy. Clusters 49 and 50 are predominately nuclei from Glioma, which reflects the fact that Glioma is a distinct non-epithelial malignancy with unique cytomorphology. Almost half of the nuclei in cluster 52 are from endometrial cancer. These nuclei are mostly from stromal cells in muscle tissue, which accounts for a large portion of endometrial tissue. Colorectal cancer is the major type for cluster 116. These nuclei appear to be surrounded by mucins, which is indicative of cancers from the GI tract. Finally, cluster 14 and 15 seems to be predominately cancers from female organs (breast, ovaries and uterus).

3.3 Assigning Cluster Labels to a New Dataset

Figure 5:
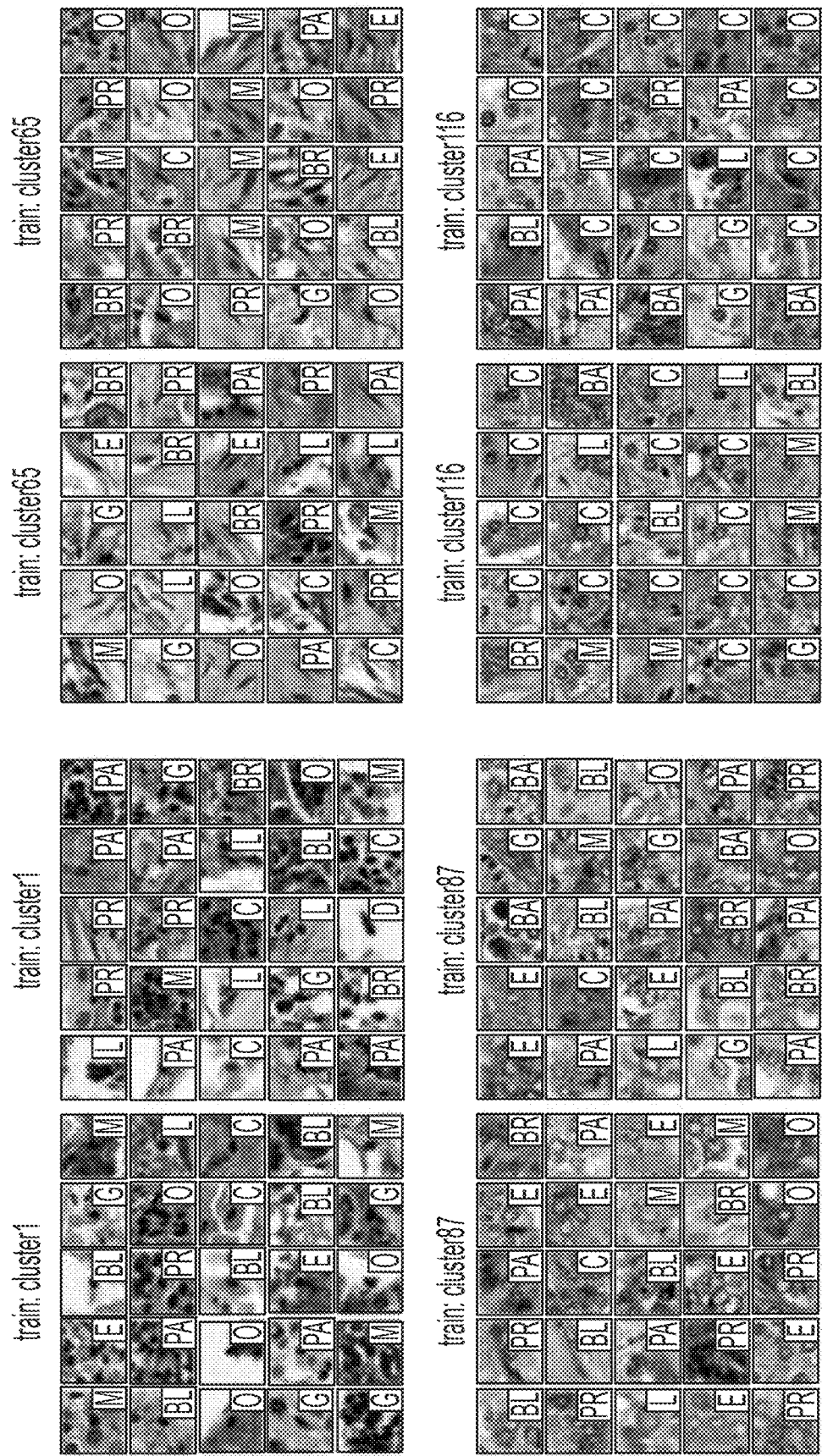
FIG. 5: Sample nuclei from selected four clusters for both dataset used for training (train) and the new dataset (test). Tissue types are coded as in previous figures.

To test the general ability of the clusters discovered by Nuc2Vec to nuclear instances unseen during training process, a much larger dataset was collected of over a billion nuclear instances from 991 slides of the ten cancer types in the same cohort. The cluster label is assigned to each instance of the dataset using the procedure described in section 2.5. In FIG. 5 sample nuclei are compared from four clusters for both the dataset used for training and the new dataset. Qualitatively, the procedure is able to assign a give nuclear instance to the cluster that best captures its morphological essence.

4. CONCLUSION

The first system was used to achieve at scale representation learning for nuclei in H&E stained histopathology images. Although the method relies on a previous supervised nucleus segmentation model, it does not require extensive annotations of nucleus subtypes. The embeddings learned by Nuc2Vec are able to capture fine-grained morphological distinctions among subtypes in nuclei population and has the potential for providing deeper understanding of the disease process and more accurate prognosis analysis.

Although most of the evaluations that were presented are qualitative, it is emphasized that histopathology is to a large extent an empirical discipline. It is aimed to further validate these results in future through two veins: 1) examine the nucleus subtyping against orthogonal technologies that applied to cancer tissue, such as spatial transcriptomics; 2) assess the value of the fine-grained subtyping by using them to construct spatial statistics features of tumor microenvironment in WSIs and perform down-stream clinical tasks such as molecular biomarker prediction.

APPENDIX A. PARTIAL VERIFICATION OF MORPHOLOGICAL FEATURES FOR EACH NUCLEUS CLUSTERS

To partially verify the morphological features for each of the 140 clusters, a board-certified pathologist provided scores in terms of size, darkness, color consistency, border irregularity, cytoplasm visibility as well as degree of elongation of the nuclei, based on visual inspections of 100 randomly selected samples for each cluster. These are fundamental nucleus morphological features used by pathologist to classify nuclei into high level categories such as lymphocytes and tumors. To partially blind the pathologists from the similarities between nearby clusters in the hierarchical clustering tree, the ordering of clusters was randomly shuffled for the sample nucleus images. The scoring table is included as the supplemental materials. These scores qualitatively verifies that most clusters discovered by Nuc2Vec captures distinct morphology in terms of these fundamental features. We want to emphasize, however, that these features alone does not constitute a good representation of the nuclei. Indeed, the hand-engineered features we designed in section 3.1 captures almost all aspects of these fundamental features (other than cytoplasm visibility). However, the qualitative comparison in FIG. 2 shows that the Euclidean distances of these hand-engineered features are unable to represent the similarities between nuclear instances. Contrastive loss provides a natural way of learning representations of nuclei, and hence the proper similarity metrics between them, which can then be used for fine-grained clustering.

Figure 6:
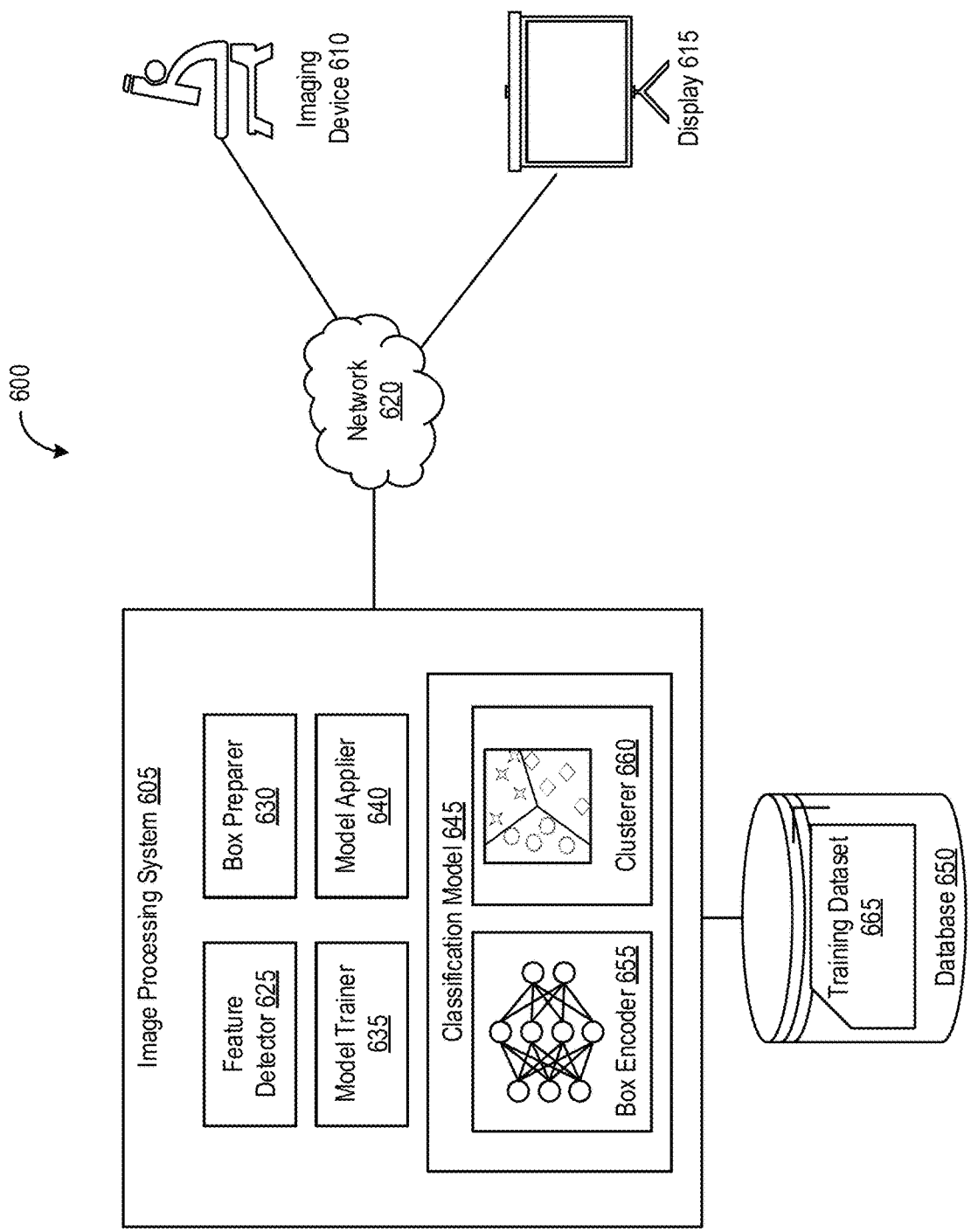
FIG. 6 depicts a block diagram of a system for classifying features from biomedical images, in accordance with an illustrative embodiment.

B. Systems and Methods for Classifying Features Corresponding to Regions of Interest (ROIs) in Biomedical Images Referring now to FIG. 6, depicted is a block diagram depicting a system 600 for classifying features from biomedical images. In overview, the system 600 may include at least one image processing system 605, at least one imaging device 610, and at least one display 615, among others, communicatively coupled via at least one network 620. The image processing system 605 may include at least one feature detector 625, at least one box preparer 630, at least one model trainer 635, at least one model applier 640, at least one classification model 645, and at least one database 650, among others. The classification model 645 may include at least one box encoder 655 and at least one clusterer 660, among others. The database 650 may store, maintain, or otherwise include at least one training dataset 665. Each of the components in the system 600 as detailed herein may be implemented using hardware (e.g., one or more processors coupled with memory) or a combination of hardware and software as detailed herein in Section C. Each of the components in the system 600 may implement or execute the functionalities detailed herein, such as those described in Section A.

In further detail, the image processing system 605 itself and the components therein, such as the feature detector 625, the box preparer 630, the model trainer 635, the model applier 640, and the classification model 645 may have a training mode and a runtime mode (sometimes herein referred to as an evaluation or inference mode). Under the training mode, the image processing system 605 may invoke the model trainer 635 to train the classification model 645 using the training dataset 665. Under the runtime, the classification model 645 may invoke the model applier 640 to apply the classification model 645 to new incoming biomedical images from the imaging device 610.

Figure 7A:
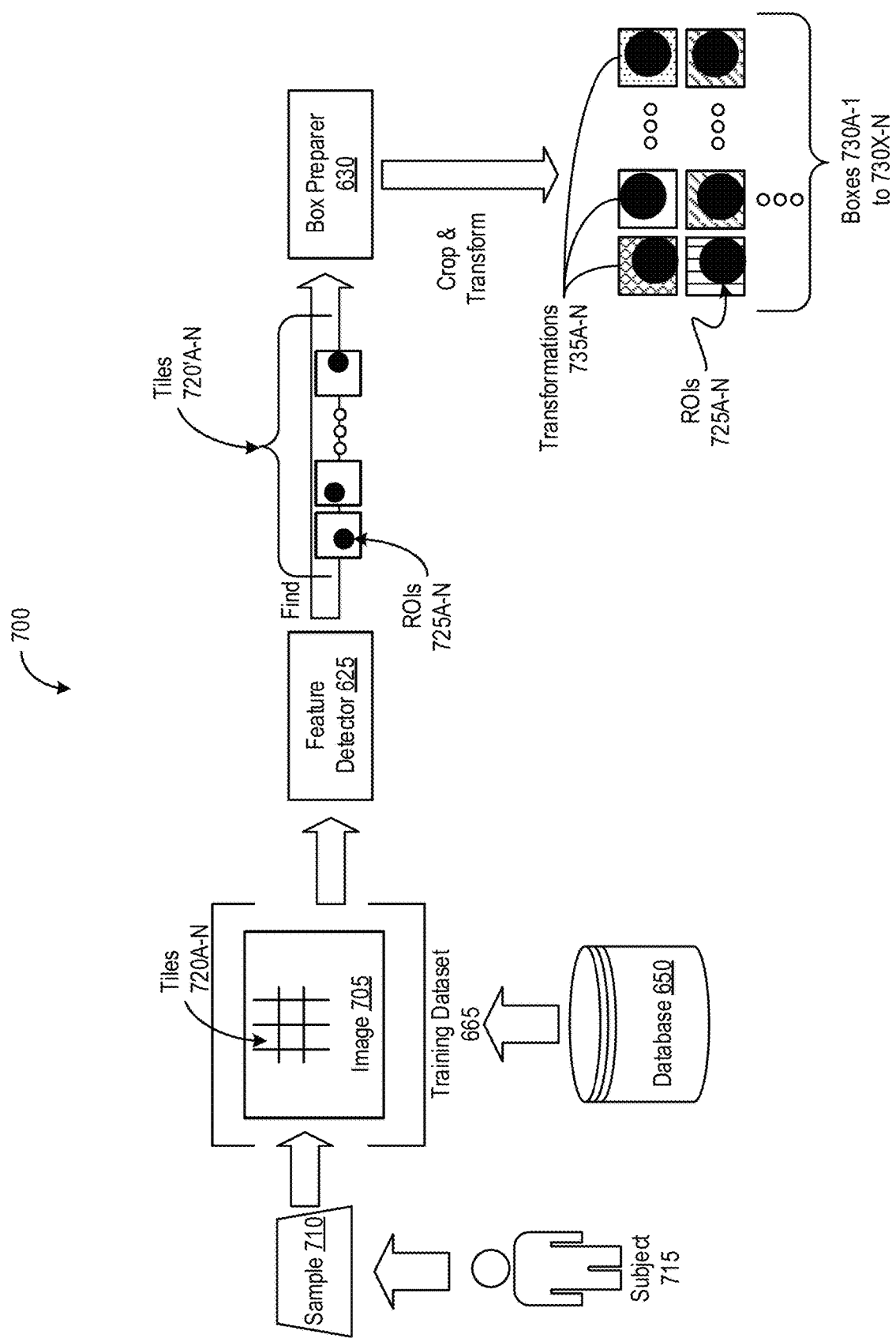
FIGS. 7A and 7B depicts a block diagram of a process for training in the system for classifying features, in accordance with an illustrative embodiment.
Figure 7B:
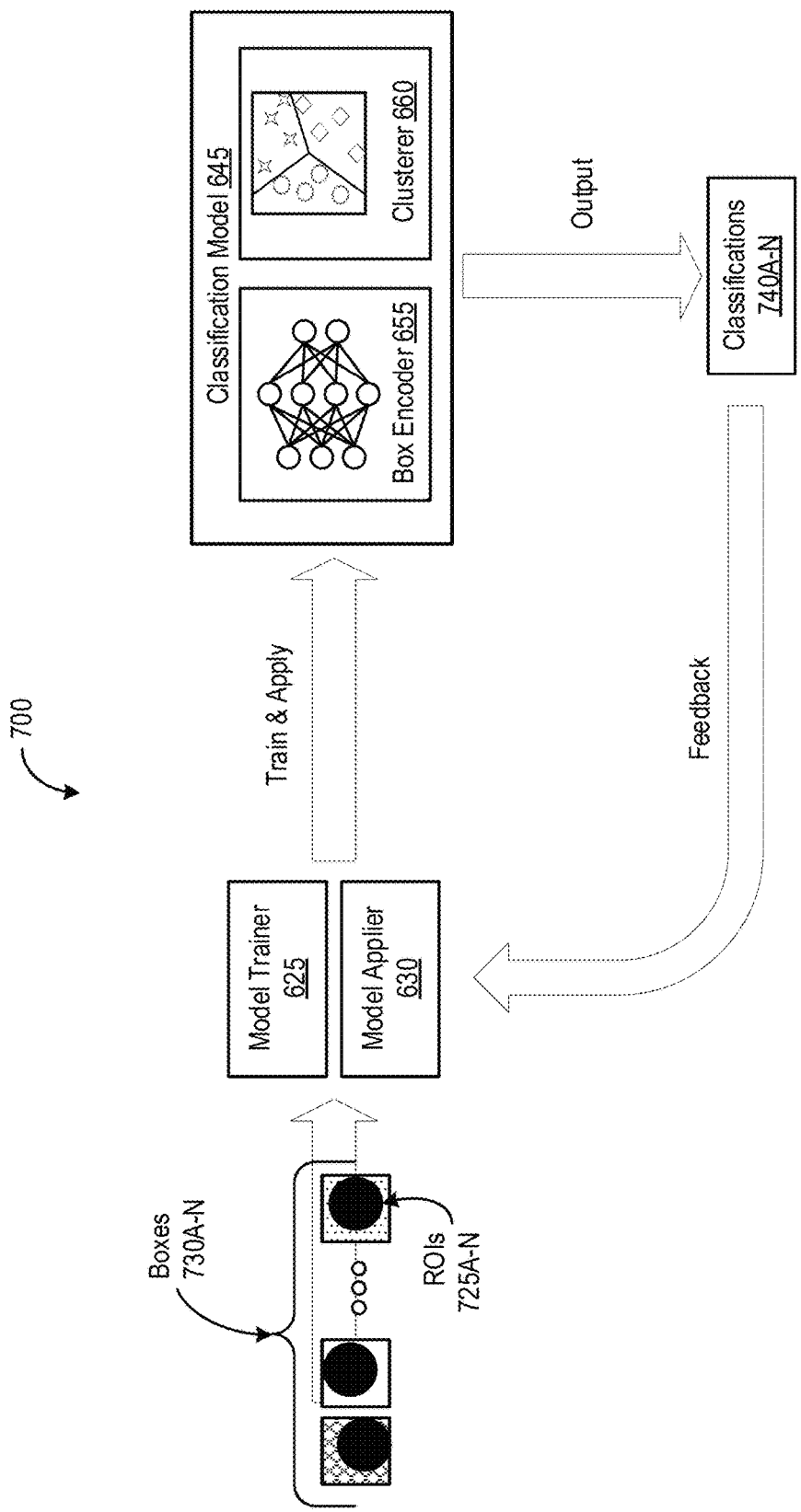

Referring now to FIGS. 7A and 7B, depicted are block diagrams of a training process 700 in the system 600 for classifying biomedical images. The process 700 may correspond to or include at least a subset of operations performed by the image processing system 605 under the training mode. Starting from FIG. 7A, under the process 700, the model trainer 635 executing on the image processing system 605 may initialize, train, or otherwise establish the classification model 645 using the training dataset 665. In initializing, the model trainer 635 may assign values (e.g., random values) to the weights and parameters of the box encoder 655 and the clusterer 660 of the classification model 645. To train the classification model 645, the model trainer 635 may access the database 650 to fetch, retrieve, or identify the training dataset 665. The training dataset 665 may be stored and maintained on the database 650 using at least one data structure (e.g., an array, a matrix, a heap, a list, a tree, or a data object). With the identification, the model trainer 635 may train the classification model 645 using the training dataset 665.

The training dataset 665 may include one or more examples (sometimes referred herein as instances). Each example in the training dataset 665 may identify or include at least one image 705. Each example may be associated with at least one sample 710. The sample 710 may be a tissue section taken or obtained from a subject 715 (e.g., a human, animal, or flora). For example, the tissue section for the sample 710 may include a muscle tissue, a connective tissue, an epithelial tissue, nervous tissue, or an organ tissue, in the case of a human or animal subject 715. The sample 710 may have or include one or more objects (e.g., cell nuclei) with one or more conditions (e.g., indicative of lesion or cancer). For instance, the tissue section for the sample 710 may contain various cell subtypes corresponding to different conditions, such as carcinoma, benign epithelial, background, stroma, necrotic, and adipose, among others.

In the training dataset 665, the image 705 may be acquired, derived, or otherwise may be of the sample 710. The image 705 itself may be acquired in accordance with microscopy techniques or a histopathological image preparer, such as using an optical microscope, a confocal microscope, a fluorescence microscope, a phosphorescence microscope, an electron microscope, among others. The image 705 may be, for example, a histological section with a hematoxylin and eosin (H&E) stain, immunostaining, hemosiderin stain, a Sudan stain, a Schiff stain, a Congo red stain, a Gram stain, a Ziehl-Neelsen stain, a Auramine-rhodamine stain, a trichrome stain, a Silver stain, and Wright's Stain, among others.

The image 705 may include one or more regions of interest (ROIs). Each ROI may correspond to areas, sections, or boundaries within the sample image 705 that contain, encompass, or include conditions (e.g., features or objects within the image). For example, the sample image 705 may be a whole slide image (WSI) for digital pathology of a tissue section in the sample 710. The ROIs depicted in the WSI may correspond to areas with cell nuclei. In some embodiments, the ROIs of the sample image 705 may correspond to different conditions. Each condition may define or specify a classification (e.g., cancer subtype) for the ROI. For example, when the image 705 is a WSI of the sample tissue, the features may correspond to cell nuclei and the conditions may correspond to various cancer subtypes, such as carcinoma (e.g., adenocarcinoma and squamous cell carcinoma), sarcoma (e.g., osteosarcoma, chondrosarcoma, leiomyosarcoma, rhabdomyosarcoma, mesothelial sarcoma, and fibrosarcoma), myeloma, leukemia (e.g., myelogenous, lymphatic, and polycythemia), lymphoma, and mixed types, among others.

Each image 705 in the training dataset 665 may define, identify, or include the set of tiles 720A-N (hereinafter generally referred to as tiles 720) from the image 705 from each example of the training dataset 665. Each tile 720 may correspond to a portion of the image 705 in the example. For instance, each tile 720 may correspond to a 1024×1024 pixel portion of the image 705. The set of tiles 720 may be disjoined or may be overlap with one another. The set of tiles 720 may be generated from the image 705 with an overlap in accordance with a set ratio. The ratio may range from 10% to 90% overlap between pairs of adjacent tiles 720. In some embodiments, the set of tiles 720 may be pre-defined in the corresponding example in the training dataset 665. In some embodiments, the set of tiles 720 may be generated by the image processing system 605 upon retrieval from the database 650.

In preparing to train the classification model 645, the feature detector 625 executing on the image processing system 605 may select or identify one or more tiles 720'A-N (hereinafter tiles 720') in each image 705 of the training dataset 665. Each tile 720' may include or correspond to a respective ROI 725A-N (hereinafter generally referred to as ROIs 725) in the image 705 corresponding to at least one feature in the sample 710. The ROI 725 may correspond to an area within the image 705 corresponding to a set number of features in the sample 710. The set of number may range, for example, between 1 to 25 features (e.g., cell nuclei in the tissue sample). In some embodiments, each tile 720' may correspond to one of the set of tiles 720 containing or including the respective ROI in the image 705. To identify the tiles 720', the feature detector 625 may apply the set of tiles 720 to a feature detection model.

The feature detection model of the feature detector 625 may include at least one input, at least one output, and a set of weights relating the input with the output, among others. The set of weights may be arranged in accordance with a machine learning (ML) model, such as a convolutional neural network (CNN) architecture. The feature detection model of the feature detector 625 may have been trained according to supervised learning using a training dataset that includes a set of examples. Each example may include an image (e.g., a biomedical image such as a WSI) and an annotation identifying locations (e.g., pixel coordinates) of ROIs in the image (or tiles in the image). The feature detection model may be trained to identify the ROIs within each image (or tiles from the image). In some embodiments, the feature detection model may perform image segmentation, and may output a segmented image identifying pixel locations of the ROIs in the image (or each tile). For example, the output may be an image segmentation model with a value of "1" for the ROI and "0" for parts of the image outside the ROI. In some embodiments, the feature detection model may perform image localization, and may output a portion (e.g., identifying a tile 720) including at least one ROI within the image (or each tile). The feature detection model may be implemented using the architectures detailed herein in conjunction with FIGS. 9A and 9B.

In some embodiments, the feature detector 625 may identify or detect one or more areas within the image 705 from each example of the training dataset 665. The detection of the areas may be prior to the application to the feature detection model. In some embodiments, the areas may correspond to a positive space within the image 705. The identification of the positive space may be based on a visual characteristic of the pixels in the image 705. For example, the positive space may correspond to areas of the image 705 that is neither white nor null as indicated by the red, green, blue (RGB) values of the pixels in the areas. With the identification, the feature detector 625 may identify the set of tiles 720 to apply using the areas corresponding to positive space within the image 705. Conversely, in some embodiments, the areas may correspond to a negative space within the image 705. The identification of the negative space may be based on a visual characteristic of the pixels in the image 705. For example, the positive space may correspond to areas of the image 705 that is white nor null as indicated by the RGB values of the pixels in the areas. The feature detector 625 may remove the areas corresponding to the negative space from the image 705. Using the remaining portion of the image 705, the feature detector 625 may identify the set of tiles 720 to apply to the feature detection model.

In applying each tile 720 from the corresponding image 705, the feature detector 625 may process the tile 720 using the set of weights in the feature detection model. From applying, the feature detection model may produce or generate the output may indicate or identify the location of the ROI 725 within the tile 720. Based on the output, the feature detector 625 determine whether the tile 720 contains, includes, or otherwise corresponds to at least one ROI 725. When the output indicates the location of the ROI 725 within the tile 720, the feature detector 625 may determine that the tile 720 corresponds to at least one ROI 725 in the image 705. The feature detector 625 may also select or identify the tile 720 for inclusion as the set of tiles 720' with at least one ROI 725. Conversely, when the output does not indicate any ROI 725 within the tile 720, the feature detector 625 may determine that the tile 720 does not correspond to at least one ROI 725 in the image 705. The feature detector 625 may also refrain from selecting or identifying the tile 720 for inclusion as the set of tiles 720'.

In some embodiments, the feature detector 625 may retrieve, identify, or otherwise receive the selection of the tiles 720' via a user interface. The feature detector 625 may render or present the image 705 via the user interface on the display 615. The display 615 may be part of the image processing system 605 or may be of another computing device. The user interface may be a graphical user interface (GUI) of an application to display the image 705. The user interface may be used (e.g., by a user or clinician) to select tiles 720' from the set of tiles 720 of the image 705 that contain, include, or correspond to the ROIs 725. Upon selection, the feature detector 625 may receive the selection of the tiles 720' from the user interface.

The box preparer 630 executing on the image processing system 605 may produce, output, or generate a set of boxes 730A-1 to 730X-N (hereinafter generally referred to as boxes 730) from the corresponding set of tiles 720'. For each tile 720', the box preparer 630 may generate a set of boxes 730. For example, for the tile 720'A, the box preparer 630 may create at least two boxes 730A-1 and 730A-2. The number of boxes 730 for each tile 720' may range, for example, from 2 to 100. Each box 730 may be generated from a respective tile 720' to include at least one ROI 725 included in the tile 720' from the image 705. In some embodiments, the box preparer 630 may generate each box 730 from cropping the corresponding tile 720' using a bounding box technique. The box 730 may correspond to a rectangular area within the respective tile 720' to encompass or bound the ROI 725. For instance, the box 730 may correspond to a 128×128 pixel region from the 1024×1024 area corresponding to the tile 720'. In some embodiments, the perimeter of the rectangular area defining the box 730 may be at a defined offset from an outer boundary of the ROI 725 in the tile 720'. The offset may be added to include more of the tile 720' within the corresponding box 730. The offset may be based on a proportion of the pixel size of the tile 720', and the proportion may range between $\frac{1}{128}$ to $\frac{3}{4}$, among others. In some embodiments, the box preparer 630 may forego or skip the cropping of the tile 720' to generate the corresponding box 730, and may use the tile 720' as the corresponding box 730.

With the generation of each box 730, the box preparer 630 may insert, include, or otherwise add one or more image transformations 735A-N (hereinafter generally referred to as image transformations 735) to the box 730. The image transformation 735 may be to carry out contrastive learning to improve the performance of the classification model 645. The image transformation 735 may include, for example, a color jitter (e.g., addition of normal noise, pink noise, Brownian noise, blue noise, or grey noise), blurring (e.g., Gaussian blurring, box blur, and defocus aberration), rotation (e.g., left 90°, right 90°, or multiples thereof), flipping (e.g., across horizontal or vertical axis), or background replacement, among others.

The box preparer 630 may identify or select at least one of the image transformations 735 to add to the box 730. The selection may be in accordance with a sampling function or a pseudo-random function. The sampling function may, for example, specify selection of the image transformation 735 in accordance with an index of the box 730 (or corresponding tile 720'). One or multiple image transformations 735 may be selected for a given box 730. For each tile 720', the box preparer 630 may add different image transformation 735 across the set of boxes 730 generated for the respective tile 720'. For example, for the tile 720'A, the box preparer 630 may determine to modify the box 730A-1 to add blurring and to modify the box 730A-2 in accordance with background replacement.

With the selection, the box preparer 630 may alter, change, or otherwise modify the box 730 in accordance with the image transformation 735. When the selected image transformation 735 is color jitter, the box preparer 630 may generate jitter using a noise function (e.g., white noise, pink noise, Brownian noise, blue noise, or grey noise). The jitter may identify color values (e.g., RGB values) of pixels in accordance with the noise function. The box preparer 630 may add the jitter in the box 730 by altering the color values of the pixels. When the selected image transformation 735 is blurring, the box preparer 630 may apply a filtering (or smoothing) function to the pixels of the box 730. The filtering function may change color values of pixels based on the color values of surrounding pixels. When the selected image transformation 735 is rotation, the box preparer 630 may apply a rotation matrix to change the color values in the box 730 from one pixel to the mapped pixel located at an angle relative to the axes of the box 730. When the selected image transformation 735 is flipping, the box preparer 630 may apply a flipping matrix to change the color values in the box 730 from one pixel to the mapped pixel across an axis (e.g., vertical or horizontal axis) of the box 730.

Continuing on, when the selected image transformation 735 is background replacement, the box preparer 630 may identify a subset of pixels corresponding to the ROI 725 within the box 730. The identification of the ROI 725 may be provided by the feature detection model in the feature detector 625. For example, the box preparer 630 may use the segmentation mask produced by the feature detection model to identify the pixels of the ROI 725. The box preparer 630 may also identify a subset of pixels corresponding to a background corresponding to portions of the box 730 outside the ROI 725. With the identifications, the box preparer 630 may maintain the subset of pixels corresponding to the ROI 725 in the box 730. The box preparer 630 may change, modify, or otherwise alter the subset of pixels corresponding to the background in the box 730.

To alter, the box preparer 630 may identify or select a background of another box 730 from one of the images 705 in the training dataset 665. The selection may be in accordance with a pseudo-random function. In some embodiments, the box preparer 630 may select multiple backgrounds from other boxes 730, and may amalgamate, combine, or add the selected backgrounds to generate a synthesized background. Upon selection, the box preparer 630 may replace the current background in the box 730 with the selected background from the other box 730. In some embodiments, the box preparer 630 may generate noise using the noise function. The noise may include random color values for pixels in the box 730. With the generation, the box preparer 630 may remove the current background in the box 730 with the generated noise, while maintaining the pixels corresponding to the ROI 725.

Moving onto FIG. 7B, in training the classification model 645, the model applier 640 executing on the image processing system 605 may apply the set of boxes 730 from the image 705 of each example in the training dataset 665 to the classification model 645. The classification model 645 may include or have a set of weights (sometimes herein referred to as parameters, kernels, or filters) and a set of centroids to process inputs and produce outputs. The set of weights may be arranged or defined in the classification model 645, for example, in accordance with a convolutional neural network (CNN) architecture in the box encoder 655. The set of centroids may be arranged or defined in the classification model 645, for example, in a feature space defined by the clusterer 660. When initialized, both the weights and the centroids may be assigned to set values (e.g., random values). Details of the architecture and functionality of the box encoder 655 and the clusterer 660 are described herein below in conjunction with FIGS. 8A-9B.

In applying, the model applier 640 may provide or feed the boxes 730 of the image 705 from each example of the training dataset 665 as the input to the classification model 645. Upon feeding, the model applier 640 may process the input boxes 730 in accordance with the set of weights to generate a embedding vector for each corresponding box 730. In addition, the model applier 640 may compare a position of each embedding vector centroids of the classification model 645 to generate at least one output. The output may include a set of classifications 740A-N (hereinafter generally referred to as a classifications 740). Each classification 740 may specify, define, or identify a condition for the feature in the sample 710 corresponding to the ROI 725 in the image 705, from which the box 730 and the embedding vector 810 is derived. The condition for the classification 740 may include, for example, benign (e.g., null or no cancer), carcinoma, sarcoma, myeloma, leukemia, lymphoma, and mixed types as discussed above.

Figure 8A:
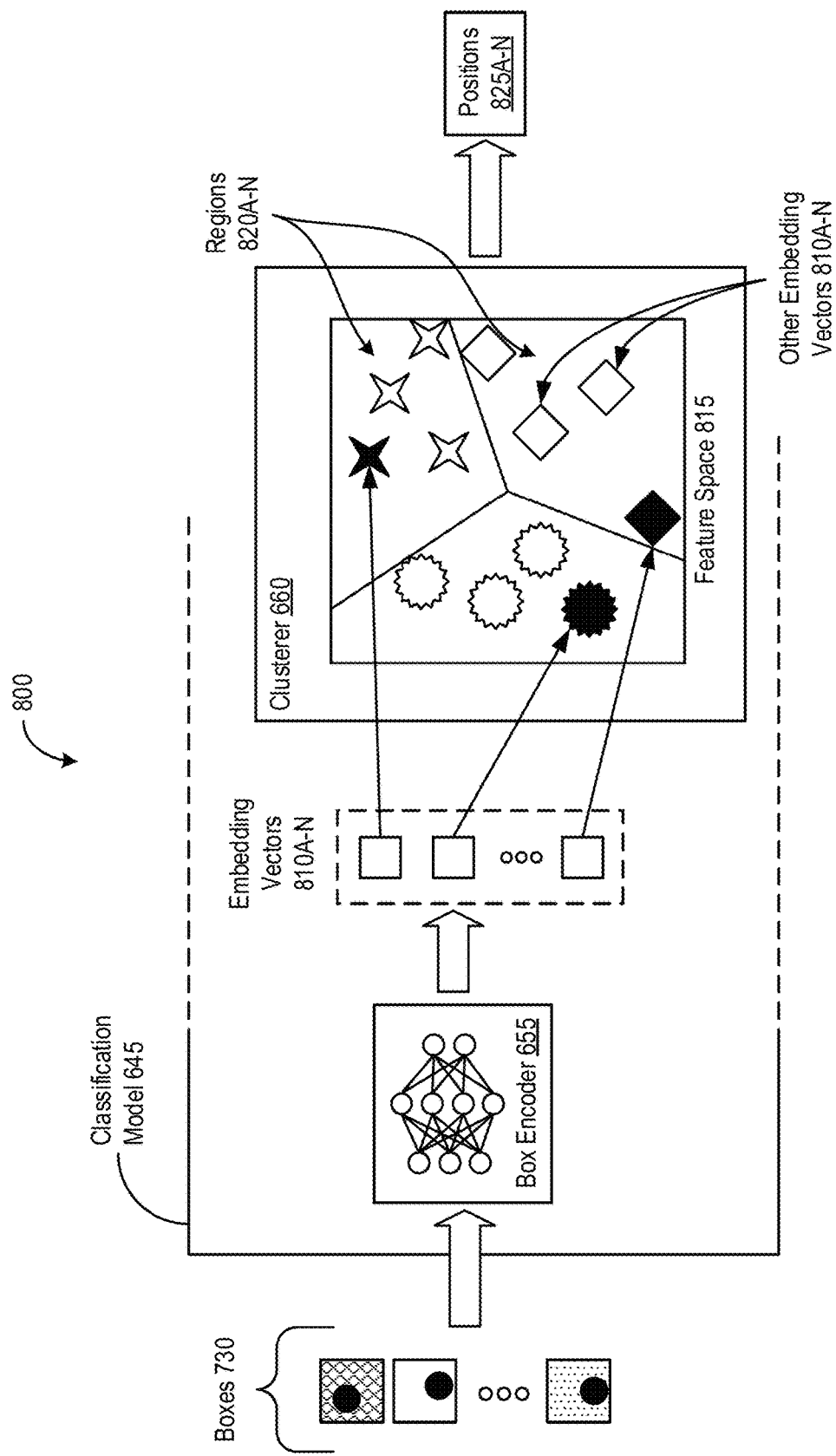
FIGS. 8A and 8B are block diagrams of an architecture for a classification model in the system for classifying features in accordance with an illustrative embodiment.
Figure 8B:
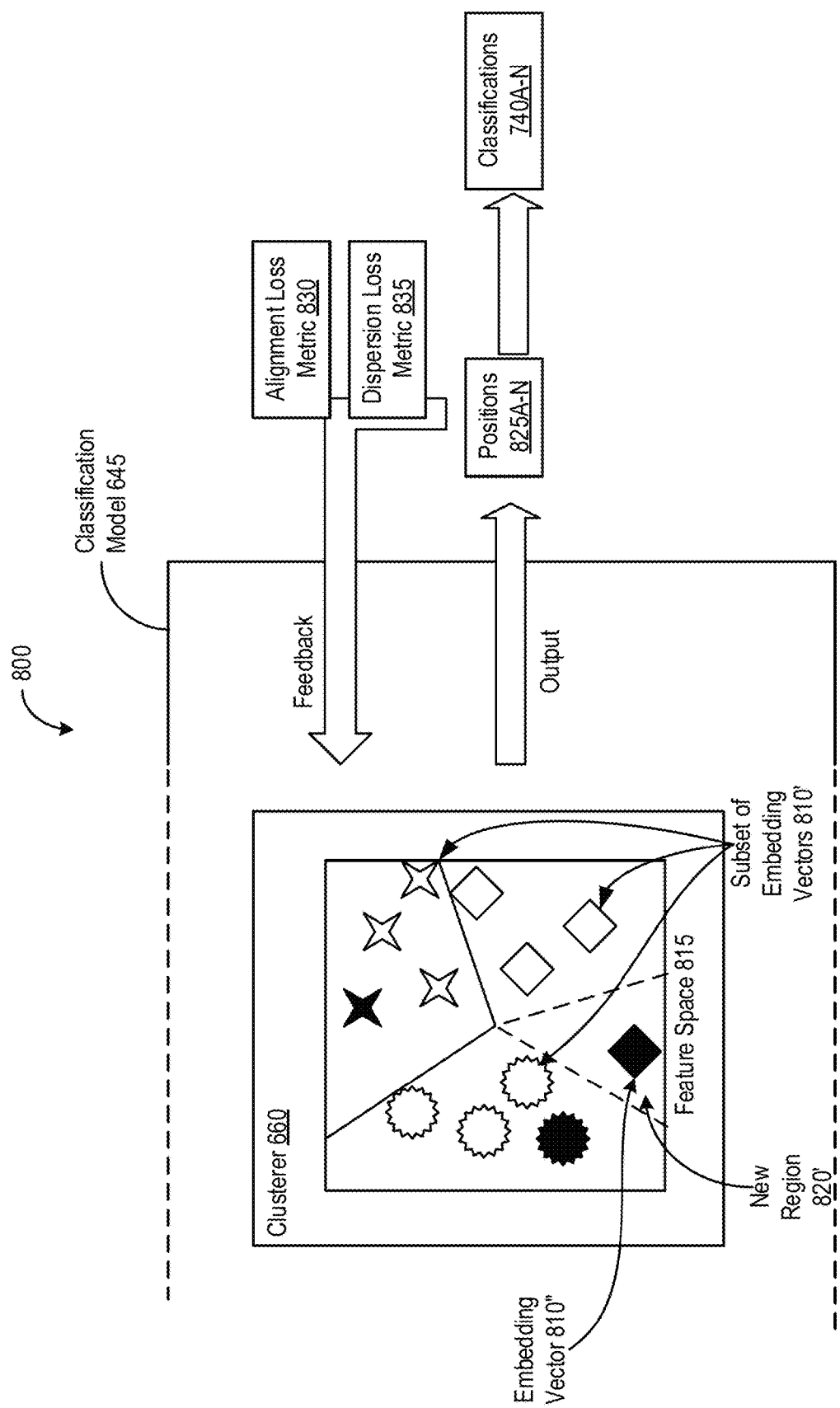

Referring now to FIGS. 8A and 8B, depicted are block diagrams of an architecture 800 for the classification model 645 in the system 600 for classifying biomedical images. Starting from FIG. 8A, under the architecture 800 for the classification model 645, the box encoder 655 may have at least one input, at least one output, and a set of weights relating the input with the output. The inputs to the classification model 645 may be provided or fed by the model applier 640 as the inputs to the box encoder 655. The input for the box encoder 655 may include at least one box 730. The set of weights may be arranged, for example, according to a convolutional neural network (CNN). The box encoder 655 may be implemented using the architectures detailed herein in conjunction with FIGS. 9A and 9B.

To process, the box encoder 655 may identify, retrieve, or otherwise receive each box 730 (e.g., in sequence) from the feature detector 625 and the box preparer 630. Upon receipt, the box encoder 655 may process the box 730 in accordance with the set of weights. From processing with the weights, the box encoder 655 may produce or generate at least one embedding vector 810A-N (hereinafter generally referred to as embedding vector 810). For each tile 720', the box encoder 655 may generate a set of embedding vectors 810 corresponding to the set of boxes 730 with differing image transformations 735 from the same tile 720'. Each embedding vector 810 may be a lower dimensional representation of the corresponding box 730 inputted into the box encoder 655. For example, the embedding vector 810 may be a feature map, encoding, or a representation of latent features in the input box 730. The embedding vector 810 may be n dimensional and may include n values along each dimension. The values in each dimension may likewise be a representation of latent features from the box 730. Each embedding vector 810 outputted by the box encoder 655 may be provided or fed forward as inputs to the clusterer 660.

The clusterer 660 may include or define the feature space 815. The feature space 815 may be an n-dimensional space in which each embedding vector 810 can be mapped. The feature space 815 may also define classifications of values for the embedding vectors 810 into one of a set of conditions (e.g., the cancer subtypes). The feature space 815 may define or otherwise include set of regions 820A-N (hereinafter generally referred to as regions 820). Each region 820 may correspond to a portion of the feature space 815. The regions 820 in the feature space 815 may be defined in accordance with a type of clustering model used for the clusterer 660, such as a hierarchical clustering, or centroid-based clustering, distribution-based clustering, density-based clustering models, among others. The embedding vectors 810 from at least a portion of the boxes 730 may be used to define the feature space 815 during training of the clusterer 660. With the hierarchical clustering, the regions 820 in the feature space 815 may be define based on distances (or linkages) of the embedding vectors 810 within the feature space 815.

Continuing on, with centroid-based clustering (e.g., k-means clustering), the regions 820 in the feature space 815 may be defined using a corresponding set of centroids. Each centroid may correspond to a data point in the n-dimensional feature space 815. Each region 820 may correspond to the portion of the feature space 815 based on a distance about the associated centroid in the feature space 815. With distribution-based clustering, the regions 820 in the feature space 815 may be defined using distribution models (e.g., Gaussian distributions). With density-based clustering (e.g., Density-based spatial clustering of applications with noise (DBSCAN)), the regions 820 in the feature space 815 may be defined using densities of positions of the embedding vectors 810 within the features space 815.

The clusterer 660 may retrieve, receive, or otherwise identify the set of embedding vectors 810 outputted by the box encoder 655 as input to map against at least one feature space 815 (sometimes referred herein as an embedding space). Upon receipt, the clusterer 660 may assign or map each embedding vector 810 to the feature space 815. To assign, the clusterer 660 may identify values along each dimension of the embedding vector 810. Based on the values along the dimensions, the clusterer 660 may identify, calculate, or otherwise determine a position 825 within the feature space 815 against which to map the embedding vector 810. The position 825 may be defined in terms of values of the n-dimensions within the feature space 815. For example, the embedding vectors 810 produced by the box encoder 655 may be n-dimensional and the position 825 of each embedding vector 810 may be mapped as a data point using the values along each of the n dimensions within the feature space 815. When assigning embedding vectors 810 generated from the boxes 730 of one image 705, the clusterer 660 may have already assigned or mapped other embedding vectors 810 from other boxes 730 from images 705 in the training dataset 665.

Moving onto FIG. 8B, using the position 825 of each embedding vector 810, the clusterer 660 may determine or identify the region 820 to which to assign the embedding vector 810. The clusterer 660 may identify the region 820 to which to assign the embedding vector 810 based on the values along the dimensions of the embedding vector 810. The feature space 815 may be divided, partitioned, or otherwise defined into the set of regions 820 in accordance with the clustering model discussed above. The clusterer 660 may compare the values along the dimensions of the embedding vector 810 with the values of the feature space 815 associated with the set of regions 820. Based on the comparison, the clusterer 660 may assign the embedding vector 810 to the region 820 in which the values along the dimensions reside. The other embedding vectors 810 may have been assigned to the regions 820 of the feature space 815 in a similar manner.

In training the clusterer 660, the model trainer 635 may partition, assign, or otherwise define the regions 820 within the feature space 815. The definition of the regions 820 in the feature space 815 may be in accordance with any number of clustering model types. For instance, the model trainer 635 may train the clusterer 660 to define the regions 820 in accordance with hierarchical clustering.

For each embedding vector 810', the model trainer 635 may select or identify one or more embedding vectors 810 neighboring the embedding vector 810'. The identification may be based on a distance between the embedding vector 810' and the other embedding vectors 810. The distance may be, for example, in terms of Euclidean distance or L-norm distance as defined in the n-dimensional feature space 815. Using the distances, the model trainer 635 may identify a set number of embedding vectors 810 neighboring the embedding vector 810'. The number may be used to maintain an equal number of embedding vectors 810 across the regions 820 to be defined in the feature space 815. The number may be defined based on a ratio or proportion between the overall number of embedding vectors 810 and the number of regions 820 to be defined within the feature space 615. Using the neighboring embedding vectors 810 for each embedding vector 810' of the subset, the model trainer 635 may partition, demarcate, or otherwise define a corresponding region 820 within the feature space 815. The region 820 may be defined to include the embedding vector 810' and the neighboring embedding vectors 810. In some embodiments, the model trainer 635 may set, designate, or otherwise assign each region 820 to one of the conditions (e.g., corresponding to cancer subtypes).

While described primarily in terms of hierarchical clustering, other types of clustering models may be used to train and implement the clusterer 660. For instance, under centroid-based clustering (e.g., k-means), the model trainer 635 may change, set, or otherwise update the set of centroids of the clusterer 660 within the feature space 815. To update, the model trainer 635 may identify the embedding vectors 810 previously assigned to each region 820 from the previous application of the embedding vectors 810. For each region

820, the model trainer 635 may identify the values of each embedding vector 810 within the feature space 815. Using the values, the model trainer 635 may determine the new values for each centroid in the feature space 815. In some embodiments, the model trainer 635 may determine the centroid based on a combination (e.g., mean) of the values of the embedding vectors 810 assigned to the region 820. Once determined, the model trainer 635 may update the each centroid to the respective new values within the feature space 815. With the re-assignment of the centroids, the training and application process may be repeated as described above upon convergence.

In some embodiments, the model trainer 635 may perform definition of the regions 820 based on a comparison of a number of generated embedding vectors 810 relative to a threshold number. The threshold number may be based on a percentage or proportion of the total number of boxes 730 derived from the images 705 of the training dataset 665. When the number of generated embedding vectors 810 less than or equal to the threshold, the model trainer 635 may define the regions 820 to correspond to the set conditions. In some embodiments, the set of conditions may be as pre-defined (e.g., in the training dataset 665). The number of regions 820 defined in the feature space 815 may correspond to the total candidate set of potential conditions. By extension, each region 820 may be defined to correspond to one of the potential conditions. To define, the model trainer 635 may identify or select a subset of embedding vectors 810' from the overall set of embedding vectors 810 mapped to the feature space 815. The selection of the subset of embedding vectors 810' may be in accordance with a sampling function or a pseudo-random function.

On the other hand, when the number of generated embedding vectors 810 is greater than the threshold, the model trainer 635 may create, assign, or otherwise define at least one new region 820' within the feature space 815. The formation of the new region 820' may be based on assignments of embedding vectors 810" (e.g., generated subsequent to the threshold) into the feature space 815. With the assignment of an embedding vector 810" in the feature space 815, the model trainer 635 may determine a distance between the embedding vector 810" and at least one embedding vector 810 in each region 820. From the determinations, the model trainer 635 may identify the minimum distance between the new embedding vector 810" and the closest embedding vector 810 in one of the regions 820.

To determine whether to form the new region 820', the model trainer 635 may compare the distance (e.g., the minimum distance) to a threshold. The threshold may identify a value of the distance at which a new region 820' is to be defined. If the distance is less than the threshold, the model trainer 635 may assign the new embedding vector 810' to the region 820 with the closest embedding vector 810. The model trainer 635 may also maintain the definition of the regions 820 within the feature space 815. In contrast, if the distance is greater than or equal to the threshold, the model trainer 635 may form the new region 820' within the feature space 815 using the new embedding vector 810". The new region 820' may include the new embedding vector 810", and may be included in the feature space 815. The new region 820' may lack correspondence with any of the conditions pre-defined in the training dataset 665 or identified during the earlier part of the training process. In some embodiments, the new region 820' may be defined by the model applier 640 (or the clusterer 660) in a similar manner during the inference mode, with embedding vectors 810 generated from newly acquired images. In this manner, new regions 820' may be also identified for new conditions during the inference mode.

For each tile 720', the model trainer 635 may calculate, generate, or otherwise determine at least one alignment loss metric 830 based on a set of positions 825 corresponding to a set of embedding vectors 810 from the same set of boxes 730. The alignment loss metric 830 may indicate a degree of deviation among the set of embedding vectors 810 from the same box 730. The alignment loss metric 830 may be calculated to minimize the distances among the set of embedding vectors 810 within the feature space 815 of the clusterer 660. The alignment loss metric 830 may be calculated in accordance with any number of loss functions, such as a norm loss (e.g., L1 or L2), mean squared error (MSE), a quadratic loss, a cross-entropy loss, and a Huber loss, among others. In general, the higher the alignment loss metric 830, the more the output set of embedding vectors 810 may have deviated from one another within the feature space 815. Conversely, the lower the alignment loss metric 830, the lower the output set of embedding vectors 810 may have deviated from one another within the feature space 815.

In addition, for each tile 720', the model trainer 635 may calculate, generate, or otherwise determine at least one dispersion loss metric 835. The dispersion loss metric 835 may be based on a comparison between a set of positions 825 corresponding to a set of embedding vectors 810 from the same tile 720' and at least one other set of positions 825 corresponding to another set of embedding vectors 810 from another tile 720'. The dispersion loss metric 835 may indicate a degree of deviations among different sets of embedding vectors 810 from corresponding differing tiles 720'. The alignment loss metric 830 may be calculated to maximize the distances among the sets of embedding vectors 810 from different tiles 720' within the feature space 815 of the clusterer 660. The dispersion loss metric 835 may be calculated in accordance with any number of loss functions, such as a norm loss (e.g., L1 or L2), mean squared error (MSE), a quadratic loss, a cross-entropy loss, and a Huber loss, among others. In general, the higher the dispersion loss metric 835, the lower the output sets of embedding vectors 810 may have deviated from one another within the feature space 815. Conversely, the lower the alignment loss metric 830, the higher the output set of embedding vectors 810 may have deviated from one another within the feature space 815.

Using the alignment loss metric 830 and the dispersion loss metric 835, the model trainer 635 modify, set, or otherwise update the classification model 645, such as the weights in the box encoder 655 and the feature space 815 in the clusterer 660. The updating of weights of the box encoder 655 or the feature space 815 may be in accordance with an optimization function (or an objective function) for the classification model 645. The optimization function may define one or more rates or parameters at which the weights of the classification model 645 are to be updated. The updating of the weights of the box encoder 655 or the feature space 815 of the clusterer 660 in the classification model 645 may be repeated until convergence.

Upon completion of training, the model trainer 635 may store and maintain the set of weights in the box encoder 655 and the definition of the feature space 815 of the clusterer 660 in the classification model 645 (e.g., on the database 650). The feature space 815 of the clusterer 660 may include a subset of regions 820 corresponding to conditions (e.g., as predefined in the training dataset 665). The feature space 815 may also include a subset of regions 820 (e.g., the new region 820') lacking correspondence to any of the conditions as pre-defined. As a result, the overall set of conditions to which embedding vectors 810' and corresponding boxes 730 can be classified into may identify or include a set of conditions (e.g., cancer subtypes) as pre-defined. The overall set of conditions may also identify or include a set of conditions (e.g., new cancer subtypes) that are derived from training the clusterer 660, outside the explicit definitions.

With the definitions of the regions 820, the clusterer 660 may determine or generate the classification 740 for the corresponding embedding vector 810 and by extension the box 730 from which the embedding vector 810 is derived. As discussed above, each classification 740 may specify, define, or identify a condition for the feature in the sample 710 corresponding to the ROI 725 in the image 705, from which the box 730 and the associated embedding vector 810 is derived. The condition for the classification 740 may include, for example, benign (e.g., null or no cancer), carcinoma, sarcoma, myeloma, leukemia, lymphoma, and mixed types as discussed above.

Based on the position 725 of embedding vector 810, the clusterer 660 may identify, select, or otherwise determine the region 820 in which the embedding vector 810 lies or is situated. With the determination, the clusterer 660 may identify the condition associated with the region 820. In some embodiment, the clusterer 660 may determine a distance between the position 825 of the embedding vector 810 and a position 825 of at least one embedding vector 810 in each region 820. Based on the distance, the clusterer 660 may identify the region 820 which is the closest to the position 825 of the embedding vector 810. With the identification, the clusterer 660 may determine the classification 740 associated with the region 820 for the embedding vector 810 and the box 730. The clusterer 660 may feed forward or output the classifications 740 for the boxes 730 inputted into the classification model 645.

Figure 9A:
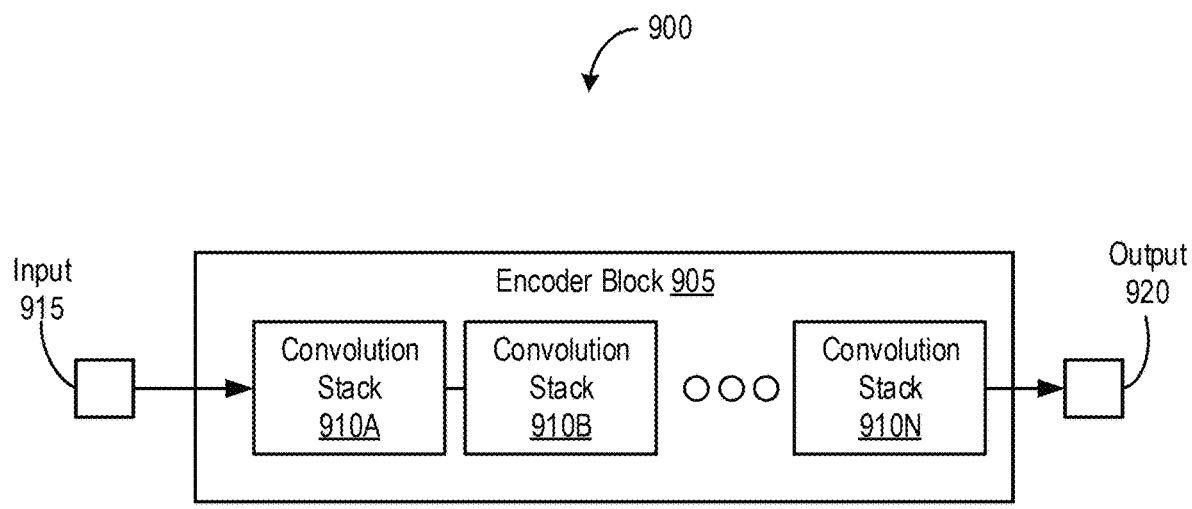
FIG. 9A is a block diagram of an architecture of an encoder block used to implement the box encoder in the system for classifying features in accordance with an illustrative embodiment.

Referring now to FIG. 9A, depicted is a block diagram of an architecture 900 of an encoder block 905 used to implement the feature detection model in the feature detector 625 and the box encoder 655 in the classification model 645 in the system. The encoder block 905 may be used to implement the feature detection model in the feature detector 625 and the box encoder 655 in the classification model 645. For example, the feature detector 625 and the box encoder 655 may be an instance of the encoder block 905. Under the architecture 900, the encoder block 905 may include one or more convolution stacks 910A-N (hereinafter generally referred to as convolution stacks 910).

The encoder block 910 may also include at least one input 915 and at least one output 920. The input 915 and the output 920 may be related via the set of weights defined in the convolution stacks 910. When used to implement the feature detection model, the input 915 of the encoder block 905 may correspond to or include the set of tile 720 from the image 705 and the output 920 may correspond or include image segmentation or localization in each tile 720. When used to implement the box encoder 655, the input 915 of the encoder block 905 may correspond to or include the box 730 from the image 705 and the output 920 may correspond or include the embedding vector 810. Each convolution stack 910 may define or include the weights the encoder block 905. The set of convolution stacks 910 can be arranged in series (e.g., as depicted) or parallel configuration, or in any combination. In a series configuration, the input of one convolution stacks 910 may include the output of the previous convolution stacks 910 (e.g., as depicted). In parallel configuration, the input of one convolution stacks 910 may include the input of the entire encoder block 905. Details regarding the architecture of the convolution stack 910 are provided herein below in conjunction with FIG. 9B.

Figure 9B:
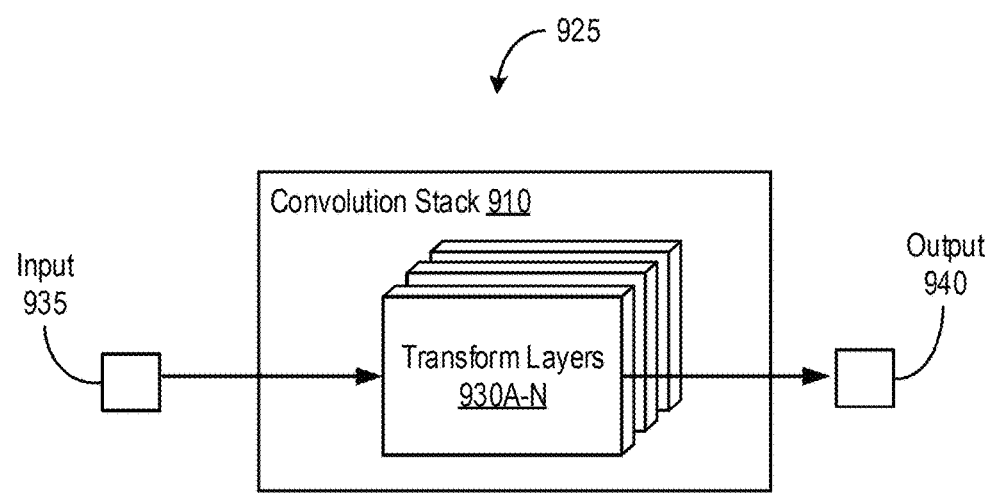
FIG. 9B is a block diagram of an architecture of a convolution stack used to implement the box encoder in the system for classifying features in accordance with an illustrative embodiment.

Referring now to FIG. 9B, depicted is a block diagram of an architecture 925 of the convolution stack 910 of the encoder block 905 used to implement the classification model 645 in the system 600. Under the architecture 925, the convolution stack 910 may include one or more transform layers 930A-N (hereinafter generally referred to as transform layers 930). The convolution stack 910 also includes at least one input 935 and at least one output feature map 490. The input 935 and the output 940 may be related via the set of weights defined in the transform layers 930 of the convolution stack 910. The set of transform layers 930 can be arranged in series, with an output of one transform layer 930 fed as an input to a succeeding transform layer 930. Each transform layer 930 may have a non-linear input-to-output characteristic. The transform layer 930 may comprise a convolutional layer, a normalization layer, and an activation layer (e.g., a rectified linear unit (ReLU), softmax function, or a sigmoid function), among others. In some embodiments, the set of transform layers 930 may be a convolutional neural network (CNN). For example, the convolutional layer, the normalization layer, and the activation layer may be arranged in accordance with CNN. The activation layer may be a softmax function for binary classifications and may be a sigmoid function for non-binary classifications.

Figure 10:
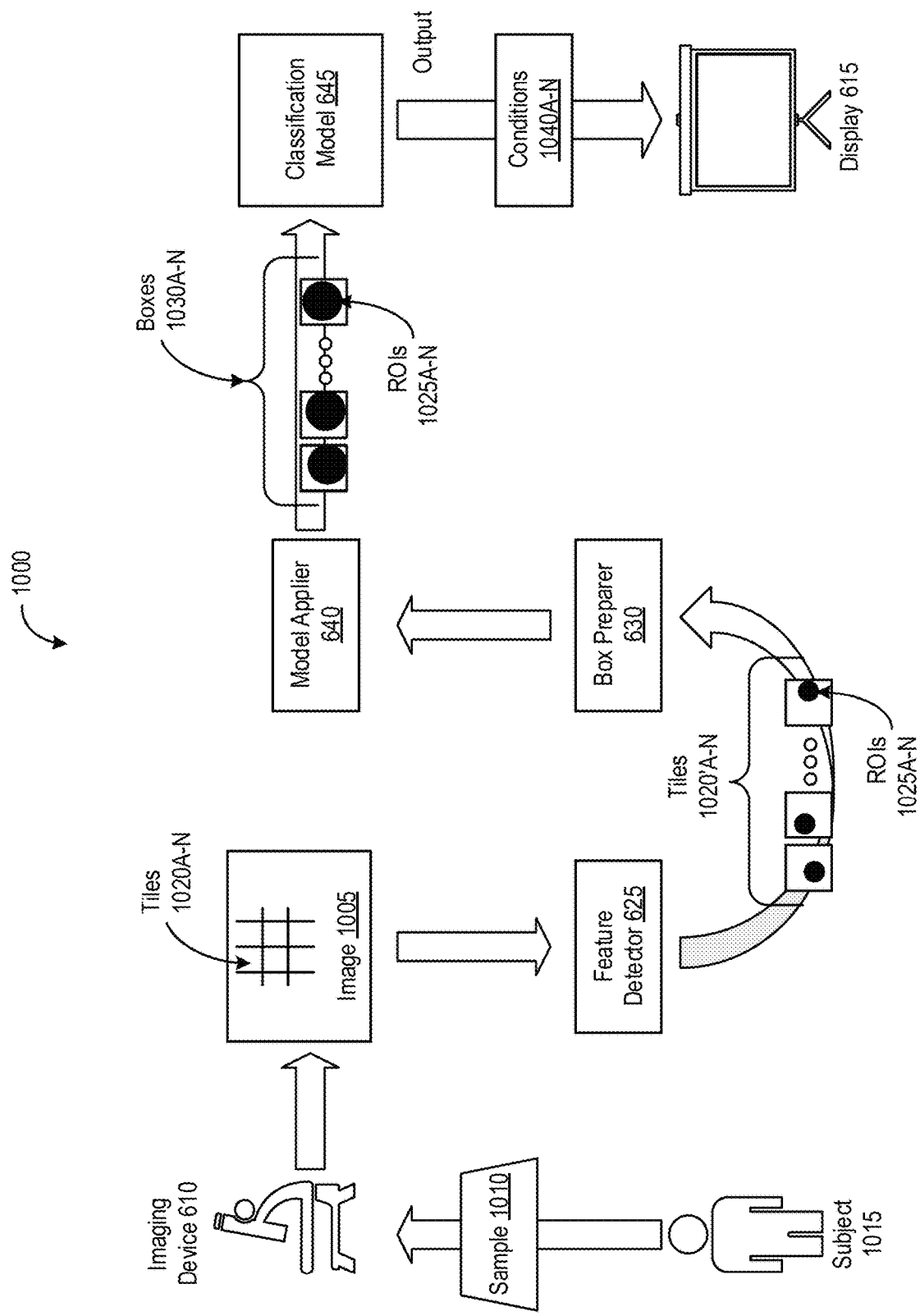
FIG. 10 depicts a block diagram of a process for inference in the system for classifying features from biomedical images, in accordance with an illustrative embodiment.

Referring now to FIG. 10, depicted is a block diagram of an inference process 1000 in the system 600 for classifying features from biomedical images. The process 1000 may correspond to or include operations performed by the image processing system 605 under evaluation mode. The operations performed under evaluation mode may overlap or may be similar to the operations performed under training mode as discussed above. Under the process 1000, the imaging device 610 may scan, obtain, or otherwise acquire at least one image 1005 of at least one sample 1010 from a subject 1015.

The image 1005 may be similar to the image 705 described above, but may be newly acquired from the imaging device 610. For instance, the image 1005 may be a histological section corresponding the sample 1010 with a hematoxylin and eosin (H&E) stain acquired via an optical microscope. The sample 1010 may be a tissue section with various cell subtypes corresponding to different conditions, such as carcinoma, benign epithelial, background, stroma, necrotic, and adipose, among others. Furthermore, the image 1005 may define, identify, or include the set of tiles 1020A-N (hereinafter generally referred to as tiles 1020). Each tile 1020 may correspond to a portion of the image 1005, and may be similarly defined as discussed above with respect to the tiles 720. Upon acquisition, the imaging device 610 may send, transmit, or otherwise provide the acquired image 1005 to the image processing system 605.

The feature detector 625 executing on the image processing system 605 may select or identify one or more tiles 1020'A-N (hereinafter tiles 1020') in the image 1005. The functionality of the feature detector 625 in the interference mode may be similar as the training mode as discussed above. Each tile 1020' may include or correspond to a respective ROI 1025A-N (hereinafter generally referred to as ROIs 1025) in the image 1005 corresponding to at least one feature in the sample 1015. The ROI 1025 may correspond to an area within the image 1005 corresponding to a set number of features in the sample 1015. The set of number may range, for example, between 1 to 25 features (e.g., cell nuclei in the tissue sample). In some embodiments, each tile

1020′ may correspond to one of the set of tiles 1020 containing or including the respective ROI in the image 1005.

In some embodiments, the feature detector 625 may identify or detect one or more areas within the image 1005. The detection of the areas may be prior to the application to the feature detection model. In some embodiments, the areas may correspond to a positive space within the image 1005. The identification of the positive space may be based on a visual characteristic of the pixels in the image 1005. For example, the positive space may correspond to areas of the image 1005 that is neither white nor null as indicated by the red, green, blue (RGB) values of the pixels in the areas. With the identification, the feature detector 625 may identify the set of tiles 1020 to apply using the areas corresponding to positive space within the image 1005. Conversely, in some embodiments, the areas may correspond to a negative space within the image 1005. The identification of the negative space may be based on a visual characteristic of the pixels in the image 1005. For example, the positive space may correspond to areas of the image 1005 that is white nor null as indicated by the RGB values of the pixels in the areas. The feature detector 625 may remove the areas corresponding to the negative space from the image 1005. Using the remaining portion of the image 1005, the feature detector 625 may identify the set of tiles 1020 to apply to the feature detection model.

To identify the tiles 1020′, the feature detector 625 may apply the set of tiles 1020 to the feature detection model. The feature detection model of the feature detector 625 may include at least one input, at least one output, and a set of weights relating the input with the output, among others. The set of weights may be arranged in accordance with a machine learning (ML) model. In applying each tile 1020 from the corresponding image 1005, the feature detector 625 may process the tile 1020 using the set of weights in the feature detection model. From applying, the feature detection model may produce or generate the output may indicate or identify the location of the ROI 1025 within the tile 1020. Based on the output, the feature detector 625 determine whether the tile 1020 contains, includes, or otherwise corresponds to at least one ROI 1025. When the output indicates the location of the ROI 1025 within the tile 1020, the feature detector 625 may determine that the tile 1020 corresponds to at least one ROI 1025 in the image 1005. The feature detector 625 may also select or identify the tile 1020 for inclusion as the set of tiles 1020′ with at least one ROI 1025. Conversely, when the output does not indicate any ROI 1025 within the tile 1020, the feature detector 625 may determine that the tile 1020 does not correspond to at least one ROI 1025 in the image 1005. The feature detector 625 may also refrain from selecting or identifying the tile 1020 for inclusion as the set of tiles 1020′.

In some embodiments, the feature detector 625 may retrieve, identify, or otherwise receive the selection of the tiles 1020′ via a user interface. The feature detector 625 may render or present the image 1005 via the user interface on the display 615. The display 615 may be part of the image processing system 605 or may be of another computing device. The user interface may be a graphical user interface (GUI) of an application to display the image 1005. The user interface may be used (e.g., by a user or clinician) to select tiles 1020′ from the set of tiles 1020 of the image 1005 that contain, include, or correspond to the ROIs 1025. Upon selection, the feature detector 625 may receive the selection of the tiles 1020′ from the user interface.

The box preparer 630 may produce, output, or generate a set of boxes 1030A-N (hereinafter generally referred to as boxes 1030) from the corresponding set of tiles 1020′. The functionality of the box preparer 630 in inference mode may be similar with the functionalities described above in training mode. Each box 1030 may be generated from a respective tile 1020′ to include at least one ROI 1025 included in the tile 1020′ from the image 1005. In some embodiments, the box preparer 630 may generate each box 1030 from cropping the corresponding tile 1020′ using a bounding box technique. The box 1030 may correspond to a rectangular area within the respective tile 1020′ to encompass or bound the ROI 1025. For instance, the box 1030 may correspond to a 128×128 pixel region from the 1024×1024 area corresponding to the image 1020′. In some embodiments, the perimeter of the rectangular area defining the box 1030 may be at a defined offset from an outer boundary of the ROI 1025 in the tile 1020′. The offset may be added to include more of the tile 1020′ within the corresponding box 1030. The offset may be based on a proportion of the pixel size of the tile 1020′, and the proportion may range between $1/128$ to $3/4$, among others. In some embodiments, the box preparer 630 may forego or skip the cropping of the tile 1020′ to generate the corresponding box 1030, and may use the tile 1020′ as the corresponding box 1030. Under inference mode, the box preparer 630 may refrain from adding image transformations 735 to the boxes 1030.

The model applier 640 may in turn retrieve, receive, or otherwise identify each box 1030 from the box preparer 630. The model applier 640 may process the boxes 1030 in a similar manner as detailed above with respect to the image 705. The model applier 640 may apply the boxes 1030 from the image 1005 to the classification model 645. In applying, the model applier 640 may provide or feed the boxes 1030 of the image 1005 as input into the classification model 645. Upon feeding, the model applier 640 may process the input boxes 1030 with the set of weights and definitions of the classification model 645 to generate at least one output. The processing may be similar as described above in relation to the input boxes 730, and the output may be similar as described above.

For each box 1030, the box encoder 655 may generate an embedding vector (e.g., similar to the embedding vector 810) in accordance with the trained set of weights. The embedding vector may be a lower dimensional representation of the corresponding box 1030 inputted into the box encoder 655. The embedding vector may be n dimensional and may include n values along each dimension. With the generation, the clusterer 660 may determine a position (e.g., similar to the position 825) for the embedding vector corresponding to the inputted box 1030. The position may be determined by mapping the embedding vector into the feature space 815 defined by the clusterer 660. Based on the position, the clusterer 660 may determine the region 820 in which the embedding vector lies in. I. Using the identified region, the clusterer 660 may output or generate a classification (e.g., similar to the classification 740).

Upon generation output, the model applier 640 may identify the output from the classification model 645. The output by the classification model 645 may include a set of classification 1040A-N (hereinafter generally referred to as classification 1040) for the corresponding set of boxes 1030. Each classification 1040 may specify, define, or identify a condition for the feature in the sample 1010 corresponding to the ROI 1025 in the image 1005 from which the box 1030 and embedding vector is derived. The condition for the classification 1040 may include, for example, benign (e.g., null or no cancer), carcinoma, sarcoma, myeloma, leukemia, lymphoma, and mixed types as discussed above. The model applier 640 may store and maintain an association between the image 1005 and the output (e.g., the classification 1040) from the classification model 645. In some embodiments, the association may be with the individual boxes 1030 and the corresponding classifications 1040. The association may be stored on the database 650 using one or more data structures, such as an array, a matrix, a heap, a list, a tree, or a data object, among others.

In addition, the model applier 640 may send, transmit, or otherwise provide information based on the output from the classification model 645. In some embodiments, the model applier 640 may provide the information associated with the output from the classification model 645 to the display 615 for presentation. The display 615 may be part of the image processing system 605 or may be of another computing device. In some embodiments, the model applier 640 may provide the association to the display 615. With the receipt, the display 615 may render or present information associated with the output or the association. In some embodiments, the display 615 may present the image 1005 (or boxes 1030) along with the classification 1040. For example, the display 615 may render a graphical user interface (GUI) with the image 1005 and the classification 1040.

In this manner, the classification model 645 may be trained to automatically determine classifications 1040 of features corresponding to ROIs 1025 in images 1005, without reliance on manually annotated data for supervised learning. This may open up use of unlabeled whole slide images (e.g., the images 705) to train the classification models to classify various features depicted in such images. In addition, the feature space 815 in the clusterer 660 in conjunction with the box encoder 655 in the classification model 645 may be used to deduce latent morphological features the boxes 1030 derived from the images 1005. The image processing system 605 may thus improve accuracy in classifications 1040 for such features in samples 1010.

Figure 11A:
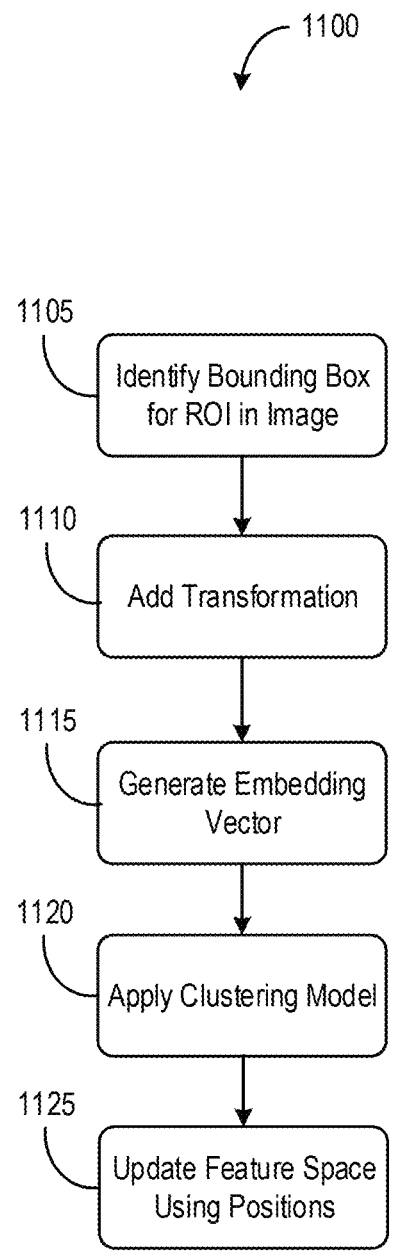
FIG. 11A depicts a flow diagram of a method of classifying features to regions of interest (ROIs) in biomedical images, in accordance with an illustrative embodiment.

Referring now to FIG. 11A, depicted is a flow diagram depicting a method 1100 of training a model to classify biomedical images using machine learning models. The method 1200 may be implemented using the system 600 described herein in conjunction with FIGS. 6-10 or the system 1200 described herein in conjunction with FIG. 12. Under method 1100, a computing system (e.g., the image processing system 605) may identify a bounding box (e.g., the box 730) for a ROI in an image (e.g., the image 705) from a training database (e.g., the training dataset 665) (1105). The computing device may add an image transformation (e.g., the image transformation 735) to the box (1110). The computing device may generate an embedding vector (e.g., the embedding vector 810) from the corresponding box (1115). The computing device may apply a clustering model (e.g., the clusterer 660) to the embedding vector to determine a position within a feature space (e.g., the feature space 815) (1120). The computing device may update the feature space using the positions of the embedding vectors (1125).

Figure 11B:
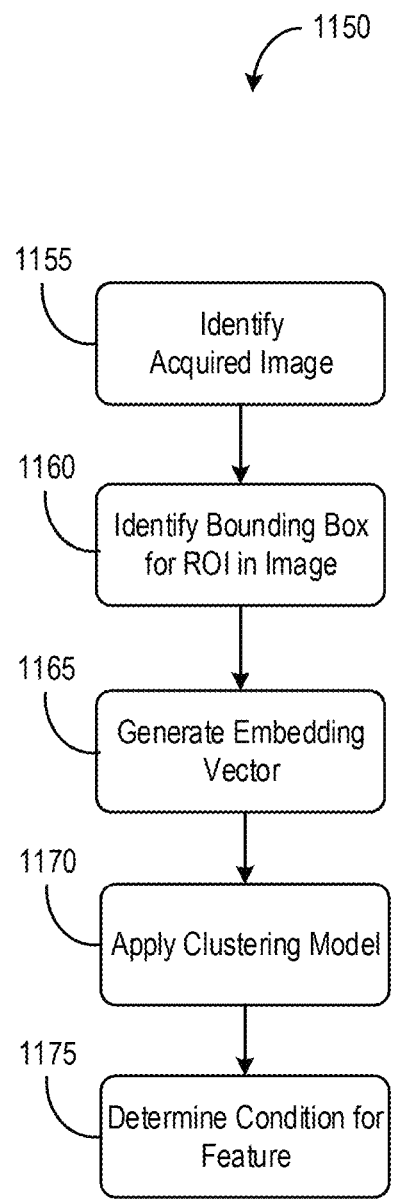
FIG. 11B depicts a flow diagram of a method of training models to classify features to regions of interest (ROIs) in biomedical images, in accordance with an illustrative embodiment.

Referring now to FIG. 11B, depicted is a flow diagram depicting a method 1150 of classifying features from biomedical images. The method 1150 may be implemented using the system 600 described herein in conjunction with FIGS. 6-10 or the system 1200 described herein in conjunction with FIG. 12. Under method 1150, a computing system (e.g., the image processing system 605) may identify an acquired image (e.g., the image 1005) (1155). The computing device may identify a bounding box (e.g., 1030) for an ROI within the image (1160). The computing device may generate an embedding vector (e.g., the embedding vector 810) using the bounding box (1165). The computing device may apply a clustering model (e.g., the clusterer 660) to the embedding vector to determine a position (1170). The computing device may determine the condition for the feature based on the position (1175).

C. Computing and Network Environment

Figure 12:
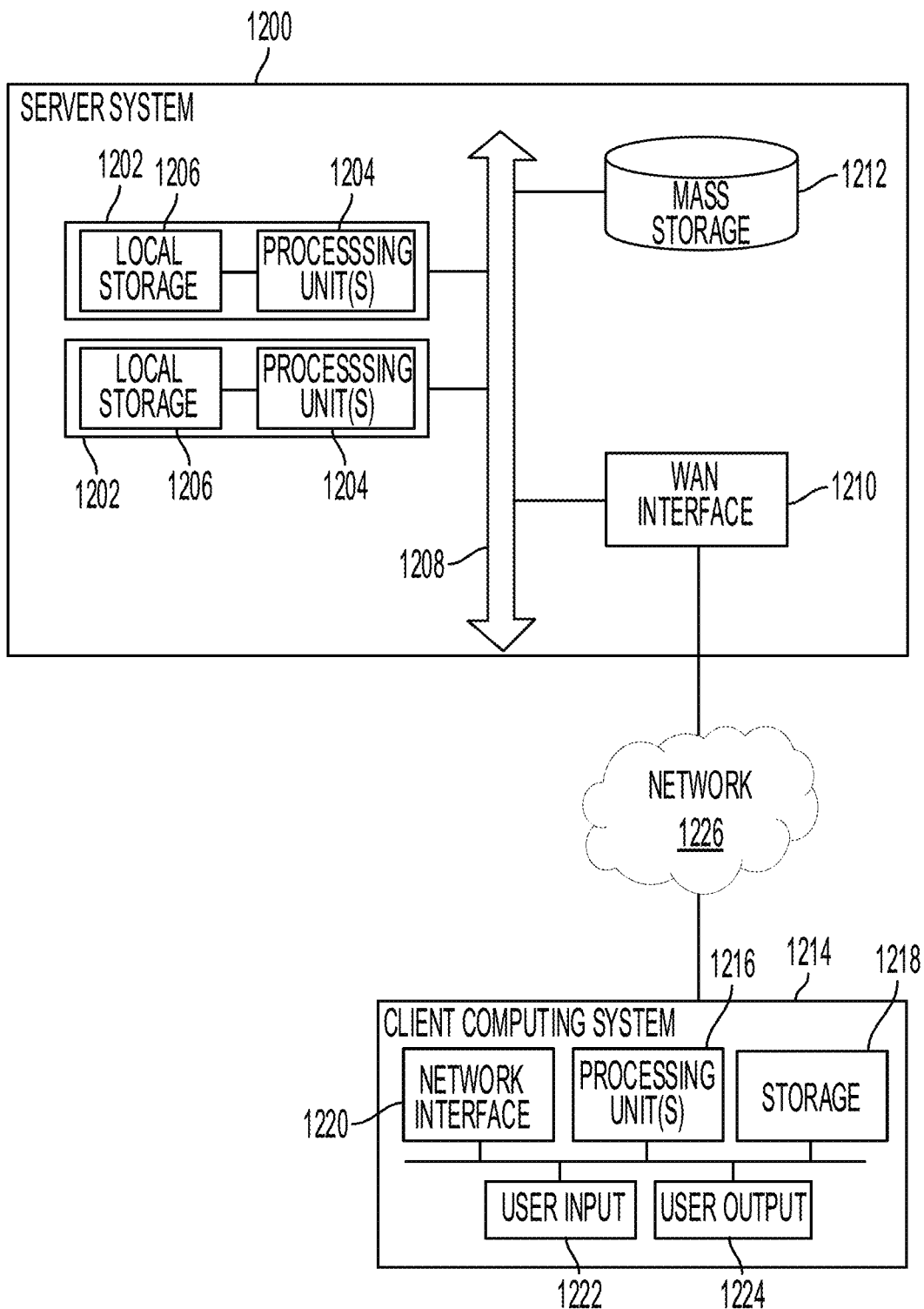
FIG. 12 depicts a block diagram of a server system and a client computer system in accordance with an illustrative embodiment.

Various operations described herein can be implemented on computer systems. FIG. 12 shows a simplified block diagram of a representative server system 1200, client computing system 1214, and network 1226 usable to implement certain embodiments of the present disclosure. In various embodiments, server system 1200 or similar systems can implement services or servers described herein or portions thereof. Client computing system 1214 or similar systems can implement clients described herein. The system 500 described herein can be similar to the server system 1200. Server system 1200 can have a modular design that incorporates a number of modules 1202 (e.g., blades in a blade server embodiment); while two modules 1202 are shown, any number can be provided. Each module 1202 can include processing unit(s) 1204 and local storage 1206.

Processing unit(s) 1204 can include a single processor, which can have one or more cores, or multiple processors. In some embodiments, processing unit(s) 1204 can include a general-purpose primary processor as well as one or more special-purpose co-processors such as graphics processors, digital signal processors, or the like. In some embodiments, some or all processing units 1204 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1204 can execute instructions stored in local storage 1206. Any type of processors in any combination can be included in processing unit(s) 1204.

Local storage 1206 can include volatile storage media (e.g., DRAM, SRAM, SDRAM, or the like) and/or non-volatile storage media (e.g., magnetic or optical disk, flash memory, or the like). Storage media incorporated in local storage 1206 can be fixed, removable or upgradeable as desired. Local storage 1206 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 1204 need at runtime. The ROM can store static data and instructions that are needed by processing unit(s) 1204. The permanent storage device can be a non-volatile read-and-write memory device that can store instructions and data even when module 1202 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 1206 can store one or more software programs to be executed by processing unit(s) 1204, such as an operating system and/or programs implementing various server functions such as functions of the system 600 of FIG. 6 or any other system described herein, or any other server(s) associated with system 600 or any other system described herein.

"Software" refers generally to sequences of instructions that, when executed by processing unit(s) 1204 cause server system 1200 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 1204. Software can be implemented as a single program or a collection of separate programs or program modules that interact as desired. From local storage 1206 (or non-local storage described below), processing unit(s) 1204 can retrieve program instructions to execute and data to process in order to execute various operations described above.

In some server systems 1200, multiple modules 1202 can be interconnected via a bus or other interconnect 1208, forming a local area network that supports communication between modules 1202 and other components of server system 1200. Interconnect 1208 can be implemented using various technologies including server racks, hubs, routers, etc.

A wide area network (WAN) interface 1210 can provide data communication capability between the local area network (interconnect 1208) and the network 1226, such as the Internet. Technologies can be used, including wired (e.g., Ethernet, IEEE 1202.3 standards) and/or wireless technologies (e.g., Wi-Fi, IEEE 1202.11 standards).

In some embodiments, local storage 1206 is intended to provide working memory for processing unit(s) 1204, providing fast access to programs and/or data to be processed while reducing traffic on interconnect 1208. Storage for larger quantities of data can be provided on the local area network by one or more mass storage subsystems 1212 that can be connected to interconnect 1208. Mass storage subsystem 1212 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1212. In some embodiments, additional data storage resources may be accessible via WAN interface 1210 (potentially with increased latency).

Server system 1200 can operate in response to requests received via WAN interface 1210. For example, one of modules 1202 can implement a supervisory function and assign discrete tasks to other modules 1202 in response to received requests. Work allocation techniques can be used. As requests are processed, results can be returned to the requester via WAN interface 1210. Such operation can generally be automated. Further, in some embodiments, WAN interface 1210 can connect multiple server systems 1200 to each other, providing scalable systems capable of managing high volumes of activity. Other techniques for managing server systems and server farms (collections of server systems that cooperate) can be used, including dynamic resource allocation and reallocation.

Server system 1200 can interact with various user-owned or user-operated devices via a wide-area network such as the Internet. An example of a user-operated device is shown in FIG. 12 as client computing system 1214. Client computing system 1214 can be implemented, for example, as a consumer device such as a smartphone, other mobile phone, tablet computer, wearable computing device (e.g., smart watch, eyeglasses), desktop computer, laptop computer, and so on.

For example, client computing system 1214 can communicate via WAN interface 1210. Client computing system 1214 can include computer components such as processing unit(s) 1216, storage device 1218, network interface 1220, user input device 1222, and user output device 1224. Client computing system 1214 can be a computing device implemented in a variety of form factors, such as a desktop computer, laptop computer, tablet computer, smartphone, other mobile computing device, wearable computing device, or the like.

Processing unit(s) 1216 and storage device 1218 can be similar to processing unit(s) 1204 and local storage 1206 described above. Suitable devices can be selected based on the demands to be placed on client computing system 1214; for example, client computing system 1214 can be implemented as a "thin" client with limited processing capability or as a high-powered computing device. Client computing system 1214 can be provisioned with program code executable by processing unit(s) 1216 to enable various interactions with server system 1200.

Network interface 1220 can provide a connection to the network 1226, such as a wide area network (e.g., the Internet) to which WAN interface 1210 of server system 1200 is also connected. In various embodiments, network interface 1220 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1222 can include any device (or devices) via which a user can provide signals to client computing system 1214. The client computing system 1214 can interpret the signals as indicative of particular user requests or information. In various embodiments, user input device 1222 can include any or all of a keyboard, touch pad, touch screen, mouse or other pointing device, scroll wheel, click wheel, dial, button, switch, keypad, microphone, and so on.

User output device 1224 can include any device via which client computing system 1214 can provide information to a user. For example, user output device 1224 can include a display to display images generated by or delivered to client computing system 1214. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1224 can be provided in addition to or instead of a display. Examples include indicator lights, speakers, tactile "display" devices, printers, and so on.

Some embodiments include electronic components, such as microprocessors, storage and memory that store computer program instructions in a computer-readable storage medium. Many of the features described in this specification can be implemented as processes that are specified as a set of program instructions encoded on a computer-readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1204 and 1216 can provide various functionality for server system 1200 and client computing system 1214, including any of the functionality described herein as being performed by a server or client, or other functionality.

It will be appreciated that server system 1200 and client computing system 1214 are illustrative and that variations and modifications are possible. Computer systems used in connection with embodiments of the present disclosure can have other capabilities not specifically described here. Further, while server system 1200 and client computing system 1214 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies including but not limited to the specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer-readable storage media; suitable media include magnetic disk or tape, optical storage media such as compact disk (CD) or DVD (digital versatile disk), flash memory, and other non-transitory media. Computer-readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method of classifying regions of interest (ROIs) in biomedical images, comprising:
    identifying, by a computing system, a first portion corresponding to an ROI in a first biomedical image derived from a sample, the ROI of the first biomedical image corresponding to a feature of the sample;
    generating, by the computing system, a first embedding vector using the first portion of the first biomedical image;
    providing, by the computing system, the first embedding vector to a clustering model, the clustering model having a feature space to define a plurality of conditions,
    wherein the clustering model is trained using a second plurality of embedding vectors generated from a corresponding second plurality of portions, each portion of the second plurality of portions corresponding to a second ROI in a second biomedical image with at least one of a plurality of image transformations, and updating the feature space based on a plurality of positions corresponding to the plurality of second embedding vectors in accordance with at least one of (i) a first loss metric to align a first subset of embedding vectors generated from a corresponding first subset of a plurality of second portions and (ii) a second loss metric to disperse the first subset of embedding vectors from at least one second subset of embedding vectors generated from a corresponding second subset of second portions;
    determining, by the computing system, a condition for the feature from the plurality of conditions based on applying the first embedding vector to the clustering model; and
    storing, by the computing system, in one or more data structures, an association between the condition for the feature and the first biomedical image.

2. The method of claim 1, further comprising providing, by the computing system, information based on the association between the condition for the first feature and the first biomedical image.

3. The method of claim 1, wherein determining the condition further comprises identifying, from a plurality of regions defined in the feature space for the plurality of conditions, a region in which the embedding vector is situated.

4. The method of claim 1, wherein the plurality of conditions defined by the feature space further comprises (i) a first subset of conditions as during training and (ii) a second subset of conditions subsequent to the training.

5. The method of claim 1, wherein the plurality of image transformations comprises at least one of color jittering, blurring, rotation, flipping, or background replacement.

6. The method of claim 1, wherein identifying the first portion further comprises generating a bounding box to define the ROI within the biomedical image.

7. The method of claim 1, wherein the feature includes at least one nucleus in the sample and the plurality of conditions includes a plurality of cancer subtypes.

8. A method of training models to classify regions of interest (ROIs) in biomedical images, comprising:
    identifying, by a computing system, a training dataset identifying a plurality of instances, each of the plurality of instances comprising a first portion corresponding to a respective ROI in a biomedical image derived from a sample, the respective ROI corresponding to a feature in the sample;
    adding, by the computing system, at least one of a plurality of image transformations to the first portion to generate a plurality of second portions for each instance of the plurality of instances;

generating, by the computing system, a plurality of embedding vectors from the plurality of second portions for each instance of the plurality of instances;

providing, by the computing system, the plurality of embedding vectors to a clustering model to determine a plurality of positions within a feature space defined by the clustering model for a plurality of conditions;

determining, by the computing system, (i) a first loss metric to align a first subset of embedding vectors generated from a corresponding first subset of a plurality of second portions and (ii) a second loss metric to disperse the first subset of embedding vectors from at least one second subset of embedding vectors generated from a corresponding second subset of second portions;

updating, by the computing system, the feature space of the clustering model based on the plurality of positions corresponding to the plurality of embedding vectors in accordance with at least one of the first loss metric or the second loss metric; and storing, by the computing system, the feature space of the clustering model to define the plurality of conditions.

9. The method of claim 8, wherein updating the feature space further comprises updating the feature space in accordance with the first loss metric and the second loss metric.

10. The method of claim 8, wherein updating the feature space further comprises:

determining a distance between an embedding vector of the plurality of embedding vectors and a first region of a plurality of regions within the feature space corresponding to the plurality of conditions defined by the training dataset; and defining, responsive to the distance being greater than a threshold, a second region to include to the plurality of regions corresponding to a condition different from any of the plurality of conditions.

11. The method of claim 8, wherein identifying the respective portion in each instance of the plurality of instances further comprises generating a bounding box to define the ROI within the biomedical image.

12. The method of claim 8, wherein adding at least one of the plurality of image transformations further comprises selecting, for the first portion, an image transformation from the plurality of image transformations in accordance with a function.

13. The method of claim 8, wherein the plurality of image comprises at least one of color jittering, blurring, rotation, flipping, or background replacement.

14. The method of claim 8, wherein the feature includes at least one nucleus in the sample and the plurality of conditions include a plurality of cancer subtypes.

15. A system for classifying regions of interest (ROIs) in biomedical images, comprising:

a computing system having one or more processors coupled with memory, configured to:

identify a first portion corresponding to an ROI in a first biomedical image derived from a sample, the ROI of the first biomedical image corresponding to a feature of the sample;

generate a first embedding vector using the first portion of the first biomedical image;

provide the first embedding vector to a clustering model, the clustering model having a feature space to define a plurality of conditions, wherein the clustering model is trained using a second plurality of embedding vectors generated from a corresponding second plurality of portions, each portion of the second plurality of portions corresponding to a second ROI in a second biomedical image with at least one of a plurality of image transformations, and updating the feature space based on a plurality of positions corresponding to the plurality of second embedding vectors in accordance with at least one of (i) a first loss metric to align a first subset of embedding vectors generated from a corresponding first subset of a plurality of second portions and (ii) a second loss metric to disperse the first subset of embedding vectors from at least one second subset of embedding vectors generated from a corresponding second subset of second portions;

determine a condition for the feature from the plurality of conditions based on applying the first embedding vector to the clustering model; and store, in one or more data structures, an association between the condition for the feature and the first biomedical image.

16. The system of claim 15, wherein the computing system is further configured to provide information based at least on the association between the condition for the first feature and the first biomedical image.

17. The system of claim 15, wherein the computing system is further configured to determining the condition by identifying, from a plurality of regions defined in the feature space for the plurality of conditions, a region in which the embedding vector is situated.

18. The system of claim 15, wherein the plurality of conditions defined by the feature space further comprises (i) a first subset of conditions during training and (ii) a second subset of conditions subsequent to the training.

19. The system of claim 15, wherein the plurality of image transformations comprises at least one of color jittering, blurring, rotation, flipping, or background replacement.

20. The system of claim 15, wherein the feature includes at least one nucleus in the sample and the plurality of conditions include a plurality of cancer subtypes.

* * * * *